(12) United States Patent
Marupaduga

(10) Patent No.: US 11,831,365 B1
(45) Date of Patent: Nov. 28, 2023

(54) USE OF PER-CONNECTION MIMO SUPPORT AS BASIS FOR DYNAMIC CONTROL OF AIR-INTERFACE COMMUNICATION WITH DUAL-CONNECTED DEVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 17/807,917

(22) Filed: Jun. 21, 2022

Related U.S. Application Data

(62) Division of application No. 16/949,776, filed on Nov. 13, 2020, now Pat. No. 11,418,237.

(51) Int. Cl.
*H04B 7/0413* (2017.01)
*H04W 76/10* (2018.01)

(52) U.S. Cl.
CPC .......... *H04B 7/0413* (2013.01); *H04W 76/10* (2018.02)

(58) Field of Classification Search
CPC . H04B 1/00; H04B 7/00; H04B 7/024; H04B 7/0404; H04L 5/00; H04L 5/0098; H04W 28/08; H04W 36/00; H04W 36/22; H04W 40/24; H04W 72/02; H04W 72/04; H04W 72/12; H04W 76/10; H04W 76/15
USPC ......... 370/252, 329–333; 375/219, 260, 267, 375/295, 316; 455/69, 436, 445, 450, 455/516, 525
See application file for complete search history.

(56) References Cited

U.S. PATENT DOCUMENTS

| | | | |
|---|---|---|---|
| 8,185,060 B2 | 5/2012 | Agashe et al. |
| 8,285,321 B2 | 10/2012 | Ji et al. |
| 9,392,515 B2 | 7/2016 | Wang et al. |
| 9,699,800 B2 | 7/2017 | Himayat et al. |
| 10,104,584 B2 | 10/2018 | Cai |
| 10,141,983 B2 | 11/2018 | Kim et al. |
| 10,237,735 B2 | 3/2019 | Kim et al. |

(Continued)

OTHER PUBLICATIONS

Tariq Mumtaz, et al., "Dual Connectivity-Based Mobility Management and Data Split Mechanism in 4G/5G Cellular Networks," IEEE Access, vol. 8, May 20, 2020.

*Primary Examiner* — Shawkat M Ali
(74) *Attorney, Agent, or Firm* — Lee & Hayes, P.C.

(57) ABSTRACT

A method and system for controlling data split of a dual-connected user equipment device (UE) when the UE has at least two co-existing air-interface connections including a first air-interface connection with a first access node and a second air-interface connection with a second access node. An example method includes (i) comparing a level of multiple-input-multiple-output (MIMO) support of the first air-interface connection with a level of MIMO support of the second air-interface connection, (ii) based at least on the comparing, establishing a split ratio that defines a distribution of data flow of the UE between at least the first air-interface connection and the second air-interface connection, and (iii) based on the establishing, causing the established split ratio to be applied. Further the method could include using the comparison as a basis to set one of the UE's air-interface connections as the UE's primary uplink path.

20 Claims, 15 Drawing Sheets

(56) References Cited

U.S. PATENT DOCUMENTS

| | | |
|---|---|---|
| 10,292,140 B2 | 5/2019 | Nam et al. |
| 10,314,055 B1 | 6/2019 | Marupaduga et al. |
| 11,418,237 B1 * | 8/2022 | Marupaduga ......... H04W 76/10 |
| 2015/0085800 A1 | 3/2015 | Sivanesan et al. |
| 2016/0234714 A1 | 8/2016 | Basu Mallick et al. |
| 2016/0337909 A1 | 11/2016 | Cai |
| 2019/0098606 A1 | 3/2019 | Sharma et al. |
| 2021/0345454 A1 | 11/2021 | Dhanapal et al. |

\* cited by examiner

USE OF PER-CONNECTION MIMO SUPPORT AS BASIS FOR DYNAMIC CONTROL OF AIR-INTERFACE COMMUNICATION WITH DUAL-CONNECTED DEVICE

REFERENCE TO RELATED APPLICATION

This is a divisional of U.S. patent application Ser. No. 16/949,776, filed Nov. 13, 2020, the entirety of which is hereby incorporated by reference.

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further, each carrier could be defined within an industry standard frequency band, by its frequency channel(s) being defined within the frequency band. Examples of such frequency bands include, without limitation, (i) bands 2, 4, 12, 25, 26, 66, 71, and 85, supporting FDD carriers (ii) band 41, supporting TDD carriers, and (iii) bands n258, n260, and n261, supporting FDD and TDD carriers.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier, such as by detecting a threshold strong reference signal broadcast by the access node on the carrier. And the UE could then engage in random-access and connection signaling (e.g., Radio Resource Control (RRC) signaling) with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could then accordingly transmit the transport block to the access node in the designated PRBs.

For each such scheduled transmission on the downlink and the uplink, the receiving end (i.e., the UE or the access node) could determine whether it received the transport block successfully from the transmitting end (i.e., the access node or the UE). For instance, the transmission could carry a cyclic redundancy check (CRC) value computed based on the transport block, and the receiving end could compute a CRC based on the received transport block and determine whether its computed CRC matches that carried by the transmission. If the receiving end receives the transmission and determines that the CRC matches, then the receiving end could transmit to the transmitting end a positive acknowledgement (ACK) control message. Whereas, if the receiving end does not receive the transmission or determines that the CRC does not match and thus that there was an error in the received transport block, then the receiving end could transmit to the transmitting end a negative acknowledgement (NACK), in response to which the transmitting end could then attempt retransmission.

In addition, for each such scheduled downlink or uplink communication on PRBs between an access node and a UE, the access node and UE could use a modulation and coding scheme (MCS) that the access node selects based on the UE's wireless channel quality and specifies in its scheduling directive to the UE. In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or that supports more bits per resource element, and when channel quality is worse, the access node may direct use of a lower-order MCS that may have a lower coding rate and/or supports fewer bits per resource element.

To facilitate these and other operations while the UE is connected with the access node, the UE could also regularly evaluate the quality of its coverage from the access node and could transmit associated coverage-quality reports to the access node. For example, the UE could regularly evaluate and report to the access node the UE's reference signal receive strength (RSRP) and/or reference signal receive quality (RSRQ), which the access node could use as a basis to trigger handover of the UE when appropriate. And as another example, based on RSRP, signal-to-noise ratio (SINR), signal-to-interference-plus-noise ratio (SINR), and/or one or more other factors, the UE could regularly evaluate the quality of its wireless communication channel with the access node and transmit to the access node channel quality indicator (CQI) reports, which the access node might use as a basis to determine the MCS to be used for air-interface communication with the UE.

In addition, when a UE is connected with an access node, the access node might provide the UE with carrier-aggregation service, where the access node serves the UE on a combination of multiple carriers at once, to help provide the UE with increased peak data rate of communication. In an example carrier-aggregation implementation, the multiple carriers on which the access node serves the UE would define a "cell group" including a primary cell (PCell) or primary component carrier (PCC) and one or more secondary cells (SCells) or secondary component carriers (SCCs). To configure such carrier-aggregation service when the UE initially connects with the access node or later, the access node could add one or more carriers to the UE's connection, noting the group of carriers in the UE context record and signaling to the UE to prepare the UE to operate accordingly.

With carrier-aggregation configured, the access node could coordinate air-interface communication with the UE on PRBs distributed across the multiple carriers. For instance, with downlink carrier aggregation, the access node could designate in a scheduling directive to the UE one or more downlink PRBs respectively in each of the UE's component carriers and could accordingly transmit data to the UE concurrently in those PRBs. And with uplink carrier aggregation, the access node could designate in a scheduling directive to the UE one or more uplink PRBs respectively in each of the UE's component carriers, and the UE could accordingly transmit data to the access node in those PRBs distributed across the carriers. Further, the UE could regularly report to the access node the UE's coverage quality per component carrier, to facilitate MCS selection and other operations.

Yet further, as the industry advances from one generation of wireless technology to the next, or in other scenarios, networks and UEs may also support dual-connectivity service, where a UE is served on multiple co-existing connections, perhaps according to different respective RATs.

For instance, a first access node could be configured to provide service according to a first RAT and a second access node could be configured to provide service according to a second RAT, and a UE positioned concurrently within coverage of both the first and second access nodes could have a first radio configured to engage in service according to the first RAT and a second radio configured to engage in service according to the second RAT. The UE may thus be able to establish a first air-interface connection with the first access node according to the first RAT and a second air-interface connection with the second access node according to the second RAT, and the access nodes may then concurrently serve the UE over those connections according to their respective RATs, each in the manner discussed above for instance.

Such dual connectivity (or "non-standalone" (NSA) connectivity) could also help to facilitate increased peak data-rate of communications, by multiplexing the UE's communications across the multiple air-interface connections. Further or alternatively, dual connectivity may provide other benefits compared with serving a UE on a single connection (as "standalone" (SA) connectivity) perhaps according to a single RAT.

In a representative dual-connectivity implementation, one of the access nodes could operate as a master node (MN), responsible for coordinating setup, management, and tear-down of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When the UE enters into coverage of such a system, the UE could initially scan for coverage and discover threshold strong coverage of the MN on a given carrier, and the UE could then responsively engage in signaling as discussed above to establish a first air-interface connection with the MN on that carrier and to attach with the network. Further, the MN may configure carrier-aggregation service for the UE by adding one or more carriers to the UE's connection with the MN, thus defining for the UE a master cell group (MCG). And if the UE supports dual-connectivity service, the MN might then coordinate setup of dual connectivity for the UE.

Coordinating setup of dual connectivity for the UE could involve engaging in signaling to coordinate setup for the UE of a second air-interface connection between the UE and the SN. For instance, the MN could engage in signaling with the SN to arrange for establishment of the second connection, and the MN could engage in signaling with the UE to cause the UE to access the SN and complete setup of that second connection. Further, the MN and/or SN could likewise configure this second connection to encompass multiple carriers, thus defining for the UE a secondary cell group (SCG).

In addition, coordinating setup of dual connectivity for the UE could also involve engaging in signaling, for each of one or more bearers established for the UE, to split the bearer so that the MN and SN can then each serve a respective portion of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With dual-connectivity so configured by way of example, the MN and SN could then serve the UE with packet-data communications over their respective connections with the UE, with each access node respectively coordinating air-interface communication in the manner described above for instance.

In an example implementation, the UE's downlink user-plane data flow would be split between the UE's two connections. For instance, when the core-network gateway system has packet data destined to the UE, that data could flow over a split bearer like one of those noted above, with the MN ultimately receiving a portion of the data and transmitting that portion of data over the UE's first air-interface connection to the UE, and with the SN ultimately receiving another portion of the data and transmitting that other portion of data over the UE's second air-interface connection to the UE. Further, the distribution of the UE's downlink user-plane data flow between the UE's connections could be done according to a downlink split ratio. And the MN and/or another controller of the UE's dual-connectivity service could be responsible for configuring that downlink split ratio.

Likewise, the UE's uplink user-plane data flow could also be split between the UE's two connections. For instance, when the UE has data to transmit on the transport network, the UE could transmit a portion of that data over its first air-interface connection to the MN, and that data could flow over an access bearer from the MN ultimately to the core-network gateway system for output onto the transport network, and the UE could transmit another portion of the data over its second air-interface connection to the SN, and that data could similarly flow over an access bearer from the SN ultimately to the core-network gateway system for output onto the transport network. And analogously here, the distribution of the UE's uplink user-plane data flow between the UE's connections could be done according to an uplink split ratio, and the MN and/or another controller of the UE's dual-connectivity service could likewise be responsible for configuring that uplink split ratio.

In addition, as to the uplink data split in an example dual-connectivity implementation, one of the UE's connections could be designated as the UE's "primary uplink path," and the other (or another) of the UE's connections could be designated as the UE's "secondary uplink path." Further, to help conserve the UE's transmission power and battery power, the UE could be configured by default to operate in a single-connection-uplink mode in which the UE limits its uplink user-plane data flow to just its primary uplink path. And upon occurrence of a trigger, such as threshold high rate of uplink data flow from the UE, the UE could transition from the single-connection-uplink mode to a split-uplink mode in which the UE will split its uplink data flow between its primary and secondary uplink paths, applying an uplink split ratio as noted above, perhaps with a majority of the uplink data flow being provided on the UE's primary uplink path.

Setting one of the UE's connections to be the UE's primary uplink path in this arrangement could also be considered to involve setting a default uplink split ratio for the UE, according to which the UE may transmit 100% of its uplink user-plane data over that connection, and the UE may transmit 0% of its uplink user-plane data over the other connection. Further, as with the downlink and uplink split ratios, the MN and/or another controller of the UE's dual-connectivity service could be responsible for controlling which of the UE's connections will be set as the UE's primary uplink path.

One technical issue in such a system, as to the downlink and/or uplink, is what split ratio should be configured for the dual-connected UE. Further, a related or subsidiary technical issue, for uplink communication from the dual-connected UE is which of the UE's connections should be set as the UE's primary uplink path, i.e., the connection to which the UE would restrict its uplink user-plane data flow until a trigger condition causes the UE to transition to operate in the split-uplink mode.

The present disclosure provides various technical mechanisms for dynamically controlling at least these aspects of dual-connectivity service. The disclosed dynamic control could be carried out by a computing system, which could be provided at least in part at the MN, such as by a host processor or other programmed processing unit of the MN, among other possibilities.

In particular, the disclosure provides for carrying out this dynamic control based at least on one or more of the following comparisons of metrics per connection: (i) a comparison of spectral efficiency of the cells on which the UE is connected respectively with the MN and with the SN, (ii) a comparison of fading in the cells on which the UE is connected respectively with the MN and with the SN, (iii) a comparison of insertion loss as to the cells on which the UE is connected respectively with the MN and with the SN, (iv) a comparison of beamforming support respectively on the UE's connections with the MN and with the SN, (v) a comparison of MIMO support respectively on the UE's connections with the MN and with the SN, and (vi) a comparison of aggregate frequency bandwidth of the UE's connections respectively with the MN and with the SN, among other possibilities.

Based at least on one or more such comparisons, for instance, the computing system could determine and set a split ratio for the UE. For instance, as to a given such metric that is a desirable service characteristic, such as spectral efficiency, beamforming support, MIMO support, or aggregate bandwidth, the MN might set a split ratio that puts a majority of the UE's data flow on the air-interface connection that has the highest level of the metric. Whereas, as to a given such metric that is an undesirable service characteristic, such as insertion loss or fading, the computing system might set a split ratio that puts a majority of the UE's data flow on the air-interface connection that has the lowest level of the metric. Further, the computing system could compute respectively per connection a weighted score of multiple such metrics and could then set a split ratio for the UE based on a comparison of the connections' weighted scores.

In addition or as part of this process, based on one or more such comparisons, the computing system could also select and set one of the UE's connections to be the UE's primary uplink path. For instance, the computing system might set as the UE's primary uplink path the connection that has the highest level of one or more desirable metrics and/or the lowest level of one or more undesirable metrics, and/or likewise based on a comparison of the connections' weighted scores.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
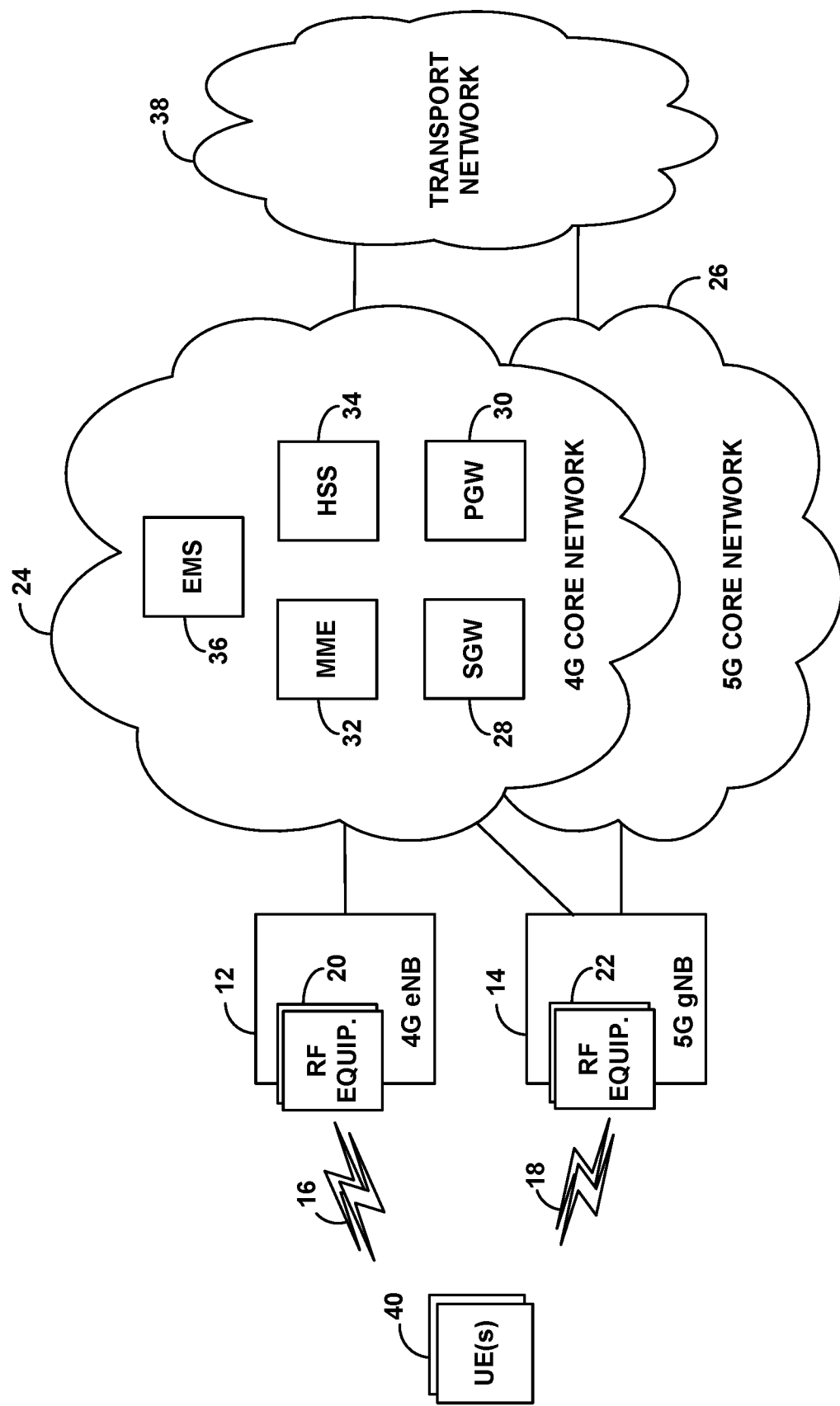
FIG. 1 is a simplified block diagram of an example wireless communication system in which features of the present disclosure can be implemented.

It should be understood, however, that the principles disclosed herein could extend to apply with respect to other scenarios as well, such as with respect to other RATs and other dual-connectivity configurations, including possibly single-RAT dual connectivity and/or dual-connectivity encompassing more than two connections. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, FIG. 1 is a simplified block diagram of an example network arrangement having a 4G eNB 12 and a 5G gNB 14. Each of these access nodes could be macro access nodes of the type configured to provide a wide range of coverage or could take other forms, such as a small cell access node, a relay, a femtocell access node, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

Each of these access nodes could also be configured to provide coverage and service on one or more carriers, with the access node's coverage on a given carrier defining a respective cell as noted above. In the example shown, for instance, the 4G eNB 12 is configured to provide coverage and service on one or more 4G carriers 16, and the 5G gNB 14 is configured to provide coverage and service on one or more 5G carriers 18.

Each such carrier could be defined in a given frequency band and could be FDD or TDD. And each carrier could have a respective frequency bandwidth on its downlink and/or uplink. For instance, an FDD carrier could have a respective downlink frequency bandwidth and a respective uplink frequency bandwidth. Whereas, a TDD carrier could have a single channel bandwidth for both downlink and uplink, though the downlink-uplink configuration of the TDD carrier could alternatively be considered to scale down the bandwidth of the carrier respectively on the downlink and uplink based on what percentage of time the carrier is downlink versus uplink.

To facilitate providing service and coverage on the illustrated carriers, the access nodes could each have a respective antenna structure, such as an antenna array, that is configured to transmit and receive electromagnetic signals in a region defined by an antenna pattern or radiation pattern, or the access nodes could share portions of a common antenna array for this purpose, among other possibilities.

Further, for each such carrier on which an access node operates, or generally, the access node might have a respective set of RF equipment, such as respective antenna elements, and respective antenna ports, jumper cables, filters, amplifiers, and various other components possibly including and/or extending between a radio and the antenna elements, that the access node would use for air-interface communication on the carrier. As shown in FIG. 1, for instance, the 4G eNB 12 may have one or more sets of RF equipment 20 for serving air-interface communications on 4G carrier(s) 16, and the 5G gNB 14 may have one or more sets of RF equipment 22 for serving air-interface communications on 5G carrier(s) 18.

The air interface on each such carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, the example arrangement includes two example core networks, designated as a 4G core network 24 and a 5G core network 26, each providing connectivity with an external transport network 38 such as the Internet for instance.

Each of these core networks could be a packet-switched network that supports virtual-packet tunnels or other interfaces between network nodes. And each network could include both a user-plane subsystem through which UE bearer communications could flow to and from the transport network 38, and a control-plane subsystem supporting functions such as UE authentication, mobility management, and bearer management, among others. The 4G and 5G core networks, however, may differ from each in various ways, such as with the 5G core network providing advanced slicing or other service options.

In the example arrangement shown, both the 4G eNB 12 and 5G gNB 14 are interfaced with the 4G core network 24, but of those two access nodes, just the 5G gNB 14 is interfaced with the 5G core network 26. In practice, the 4G core network 24 could be the core network for UEs served with standalone 4G connectivity by the 4G eNB 12 and for UEs served with EN-DC by the 4G eNB 12 and the 5G gNB 14. Whereas, the 5G core network 26 could be the core network for UEs served with standalone 5G connectivity by the 5G gNB 14. For simplicity, representative elements of the 4G core network 24 are shown, but details of the 5G core network 26 are not shown.

As shown, for instance, the core network 24 could be an Evolved Packet Core (EPC) network and could include a serving gateway (SGW) 28, a packet data network gateway (PGW) 30, a mobility management entity (MME) 32, a home subscriber server (HSS) 34, and an element management system (EMS) 36, although other arrangements are possible as well.

In an example implementation, without limitation, the 4G eNB 12 and 5G gNB 14 could each have an interface with the SGW 28, the SGW 28 could have an interface with the PGW 30, and the PGW 30 could provide connectivity with the transport network 38 such as the Internet. Further, the 4G eNB 12 could have interfaces with the 5G gNB 14 and with the MME 32, and the MME 32 could have an interface with the SGW 28, so that the MME 32 could coordinate setup of bearers for UEs to enable the UEs to engage in packet-data communications on the transport network 38.

Still further, the HSS 34 could store or have access to UE profile records, which could specify service-subscription plans, UE configurations, and/or other such UE capability information, such as whether a UE is EN-DC capable for instance. And the EMS 36 could operate as a central repository of operational data for the wireless communication network and to control and manage operation of various network elements such as the access nodes.

FIG. 1 also depicts various example UEs 40 that may from time to time be within coverage of the illustrated access nodes. Each of these UEs could take any of the forms noted above, among other possibilities. Further, some or all these UEs could be equipped with a 4G LTE radio and/or a 5G NR radio, and could have associated circuitry and logic to support 4G LTE service and/or 5G NR service, and perhaps EN-DC service. Further, the 4G eNB 12 and 5G gNB 14 could be configured to serve multiple such UEs at once.

Upon entering into coverage this example system, a representative such UE could scan for and discover coverage of a given access node and could then responsively engage in signaling to connect with the access node as discussed above.

For instance, if the UE supports just 4G service or if the UE supports EN-DC service, the UE might initially scan for 4G coverage and discover threshold strong coverage of 4G eNB 12 on a 4G carrier 16, and the UE may then responsively engage in random access and RRC signaling with the 4G eNB 12 to establish a 4G connection between the UE and the 4G eNB 12 on that carrier. Further, the 4G eNB 12 may add one or more other 4G carriers 16 to the UE's 4G connection to provide the UE with 4G carrier-aggregation service.

Whereas, if the UE supports just 5G service, the UE might initially scan for 5G coverage and discover threshold strong coverage of the 5G gNB 14 on a 5G carrier 18, and the UE may then responsively engage in random access and RRC signaling with the 5G gNB 14 to establish a 5G connection between the UE and the 5G gNB 14 on that carrier. And the 5G gNB 14 could likewise add one or more other 5G carriers 18 to the UE's 5G connection to provide the UE with 5G carrier-aggregation service.

Once the UE is connected with an access node, the UE may then further transmit to the access node an attach request message, which the access node may forward to a core-network controller to trigger setup for the UE of one or more user-plane bearers as noted above. Further, the access node could establish in data storage a context record for the UE as noted above, and the access node could then serve the UE with packet-data communications over the UE's connection as discussed above.

For example, once a UE connects with the 4G eNB 12, the UE could send an attach request message, which the 4G eNB 12 could forward to MME 32 for processing. Upon authenticating and authorizing the UE for service, the MME 32 and 4G eNB 12 could then coordinate setup for the UE of at least one user-plane bearer. For instance, the MME 32 could engage in signaling with the 4G eNB 12 and the SGW 28 to coordinate setup for the UE of an S1-U packet tunnel between the 4G eNB 12 and the SGW 28, and the SGW 28 could responsively engage in signaling with the PGW 30 to coordinate setup for the UE of an associated S5 packet tunnel between the SGW 28 and the PGW 30. Further, the 4G eNB 12 could engage in signaling with the UE to establish for the UE an associated data radio bearer. And once the UE is so connected and attached, the 4G eNB 12 could then serve the UE in a standalone 4G mode, in the manner discussed above.

In addition, when a UE connects with an access node, and/or at other times, the access node may obtain capability data that indicates various capabilities of the UE, such as whether the UE is dual-connectivity (e.g., EN-DC) capable, and whether and to what extent the UE supports MIMO and other service features. For instance, the access node could obtain this capability data from the UE and/or from the core-network controller and HSS 34. And the access node could store the capability data in the UE context record for reference while serving the UE.

For each such EN-DC capable UE that connects with the 4G eNB 12, the 4G eNB 12, operating as MN, could then work to configure EN-DC service for the UE.

For instance, the 4G eNB 12 could first determine that the UE is within threshold strong coverage of the 5G gNB 14 on one or more 5G carriers 18, perhaps based on measurement reporting from the UE or based on coverage assumptions. And the 4G eNB 12 could then engage in signaling to configure for the UE a secondary 5G connection with the 5G gNB 14 on the one or more 5G carriers. For example, the 4G eNB 12 could transmit to the 5G gNB 14 an SN-Addition request to cause the 5G gNB 14 to allocate resources for a 5G connection for the UE on the one or more 5G carriers 18, the 4G eNB 12 could receive an SN-Addition-Request acknowledge message from the 5G gNB 14, and the 4G eNB 12 could engage in associated RRC signaling with the UE, in response to which the UE could then access and complete establishment of the 5G connection. Further, the 4G eNB 12 could engage in signaling to establish a split bearer, such to transfer the UE's access bearer (e.g., the UE's S1-U tunnel) to the 5G gNB 14 and to arrange for a bearer split at the 5G gNB 14.

With EN-DC service configured for the UE, the 4G eNB 12 and 5G gNB 14 could then concurrently serve the UE, each over its respective connection with the UE and each in the manner discussed above—such as learning of the UE's channel quality to establish an applicable MCS, scheduling PRB allocation for air-interface communication with the UE, and so forth.

Further, the UE's data flow could be split between the UE's 4G and 5G connections as discussed above. For instance, when the PGW 30 receives user-plane data from the transport network 38 for transmission to the UE, that data may flow over a split access bearer, and the 4G eNB 12 may transmit a portion of the data over the UE's 4G connection to the UE, while the 5G gNB 14 may transmit another portion of the data over the UE's 5G connection to the UE. And when the UE has user-plane data to transmit on the transport network 38, the UE may transmit a portion of the data over its 4G connection to the 4G eNB 12, which may forward the data over an access bearer for transmission directly or indirectly through the core network 24 to the transport network 38, and the UE may transmit another portion of the data over its 5G connection to the 5G gNB 14, which may likewise forward the data over an access bearer for transmission directly or indirectly through the core network 24 to the transport network 38.

And the UE may treat one of the UE's connections as the UE's primary path as discussed above, restricting the UE's uplink data flow to that connection until the level of data flow rises to a threshold level or other reason exists to offload some of the data flow to the UE's other connection.

In line with the discussion above, a computing system could determine what split ratio should be used for the UE's data flow, perhaps respectively for the downlink and for the uplink, and the computing system could cause the determined data split to be applied. Further, the computing system could decide which of the UE's connections will be the UE's primary path, and the computing system could cause the UE to operate accordingly. In practice, the computing system could be provided at the 4G eNB 12, at the 5G eNB 14, and/or elsewhere, possibly even at the UE.

Controlling the UE's downlink split ratio could involve setting the downlink split ratio at the point where the downlink split would occur, such as signaling to, programming, and/or otherwise provisioning the entity that will perform the downlink data split, so as to cause that entity to programmatically apply the desired downlink split ratio. For instance, if the downlink split will occur at the SGW 28, this could involve setting the SGW 28 apply the downlink split ratio. Whereas, if the downlink split will occur at the 4G eNB 12, this could involve setting the 4G eNB 12 to apply the downlink split ratio. And if the downlink split will occur at the 5G gNB, this could involve setting the 5G gNB 14 to apply the downlink split ratio.

Controlling the UE's uplink split ratio, on the other hand, could involve engaging in RRC signaling or the like with the UE to direct and thus cause the UE to apply the desired uplink split ratio. For instance, this could involve the 4G eNB 12, as the UE's MN, transmitting to the UE an RRC connection reconfiguration message that specifies what uplink split ratio the UE should apply, and the UE responsively setting itself to apply that uplink split ratio.

Further, controlling the UE's primary uplink path could likewise involve engaging in RRC signaling or the like with the UE to direct and thus cause the UE to treat a designated connection as the UE's primary uplink path. For instance, this could involve the 4G eNB 12, as the UE's MN, transmitting to the UE an RRC connection reconfiguration message that specifies which of the UE's connections the UE treat as the UE's primary uplink path, and the UE responsively setting itself to operate accordingly.

In addition, the computing system that carries out these control operations could dynamically repeat the process and vary the settings over time as conditions and considerations change. For instance, after having set the UE's downlink split ratio to a first determined downlink split ratio, the computing system could later set the UE's downlink split ratio to a second, different determined downlink split ratio. Likewise, after having set the UE's uplink split ratio to a first determined uplink split ratio, the computing system could later set the UE's uplink split ratio to a second, different determined uplink split ratio. And after having set one of the UE's to be the UE's primary uplink path, the computing system could later set the UE's other connection to be the UE's primary uplink path.

In an example implementation, the 4G eNB 12, as the UE's MN, could be responsible for carrying out these control operations.

For instance, the 4G eNB 12 could determine what downlink split ratio to apply for the UE, and the 4G eNB 12 could then cause that determined downlink split ratio to be applied. For example, if the UE's downlink split occurs at the 4G eNB 12, then the 4G eNB 12 could set itself to apply the determined downlink split ratio, according to which the 4G eNB 12 would transmit to the UE over the UE's 4G connection a portion of the UE's downlink user-plane data flow and would forward to the 5G gNB 14 for transmission to the UE over the UE's 5G connection another portion of the UE's downlink user-plane data flow. Whereas, if the UE's downlink data split occurs at the 5G gNB 14, then the 4G eNB 12 could transmit to the 5G gNB 14 a directive to which the 5G gNB 14 could respond by setting itself to apply the determined downlink split ratio. Analogous processing could also occur if the downlink split is elsewhere, such as at the SGW 28.

Likewise, the 4G eNB 12 could determine what uplink split ratio to apply for the UE (perhaps the same as the downlink split ratio, or perhaps different) and could cause the UE to apply the determined uplink split ratio. For example, the 4G eNB 12 could transmit to the UE an RRC connection reconfiguration message specifying the determined uplink split ratio, to which the UE could respond by implementing the uplink split ratio, accordingly transmitting a portion of the UE's uplink user-plane data flow over the UE's 4G connection to the 4G eNB 12 and transmitting another portion of the UE's uplink user-plane data flow over the UE's 5G connection to the 5G gNB 14.

Further or as part of establishing the UE's uplink split ratio, the 4G eNB 12 could determine which of the UE's connections should be the UE's primary uplink path. And the 4G eNB 12 could transmit to the UE an RRC connection reconfiguration message that directs the UE to treat the determined connection as the UE's primary uplink path, to which the UE could respond accordingly.

Alternatively, the 5G gNB 14 could carry out some or all of these control functions. For instance, the 5G gNB 14 could analogously determine what downlink split ratio should be applied for the UE and could analogously cause that downlink split ratio to be applied. And/or the 5G gNB 14 could analogously determine what uplink split ratio should be applied for the UE and/or what connection should be the UE's primary uplink path and could analogously cause that uplink split ratio or primary uplink path setting to be applied, possibly signaling to the 4G eNB 12 to cause the 4G eNB 12 to engage in RRC signaling with the UE to cause the UE to operate accordingly.

In addition, as noted above, the computing system could take into account one or more per-connection metrics as a basis to carry out these dynamic control operations. For instance, as to a given metric that is desirable, the computing system could establish for the UE a split ratio that puts a majority of the UE's data flow on the connection having a higher value of that metric, or as to a given metric that is undesirable, the computing system could established for the UE split ratio that puts a majority of the UE's data flow on the connection having a lower value of that metric. And the computing system could consider multiple metrics in combination, such as by establishing per connection a weighted score based on multiple metrics, and then establishing the data split based on a comparison of the connections' respective weighted scores.

Further, the establishing of the split ratio or decision of which connection should be the UE's primary uplink path could be done in real time while the UE is dual connected or could be done before the UE is dual connected, to facilitate controlling the UE's split ratio and/or primary uplink path when the UE is dual connected.

The following sub-sections will now discuss various such metrics as factors that the computing system could use, alone or in combination with each other and/or with other factors, as a basis to dynamically control the split ratio that will be used for a dual-connected UE's data flow, and perhaps further or as part of that process, to control which of the UE's connections the UE will use as the UE's primary uplink path. For simplicity, these sub-sections will address example implementation by the 4G eNB 12. But it should be understood that other implementations are possible as well.

Controlling the UE's Data Split Based on Per-Connection Spectral Efficiency

One basis that the 4G eNB 12 could use for this dynamic control is a comparison of spectral efficiency of the cells on which the UE is connected respectively with the 4G eNB 12 and with the 5G gNB 14.

Spectral efficiency of a cell is a measure of the data rate that the cell supports per unit of frequency spectrum, typically represented as a quantity of bits per second per Hertz (i.e., bits/s/Hz), and typically with respect to the underlying baseband data being communicated, excluding overhead such as error-correction bits. In general, if the UEs served by a cell tend to have relatively good channel quality and/or if the cell otherwise tends to serve the UEs with relatively high data rates per unit of frequency spectrum, then the cell would have relatively high spectral efficiency, which would represent a relatively desirable context for serving any given UE. Whereas, if the UEs served by a cell tend to have relatively poor channel quality and/or if the cell otherwise tends serves UEs with relatively low data rates per unit of frequency spectrum, then the cell would have relatively low spectral efficiency, which would represent a less desirable (or a relatively undesirable) context for serving any given UE.

Accordingly, the 4G eNB 12 could determine spectral efficiency of the UE's 4G connection as or otherwise based on spectral efficiency of the one or more 4G cells on which the UE is connected with the 4G eNB 12, and the 4G eNB 12 could determine spectral efficiency of the UE's 5G connection as or otherwise based on spectral efficiency of the one or more 5G cells on which the UE is connected with the 5G gNB 14. The 4G eNB 12 could then compare the determined spectral efficiency of the UE's 4G connection with the determined spectral efficiency of the UE's 5G connection. And based at least on that comparison, the 4G eNB 12 could determine and set a split ratio for the UE.

For instance, based at least on this comparison, the 4G eNB 12 could set a split ratio that puts a majority of the UE's data flow on the UE's connection that has the highest determined spectral efficiency, perhaps setting the split ratio to be equal to or otherwise based on a ratio of the connections' respective determined spectral efficiencies. For example, if the determined spectral efficiency of the UE's 5G connection is twice that of the UE's 4G connection, then the 4G eNB 12 could set a split ratio that puts twice as much of the UE's data flow on the UE's 5G connection as on the UE's 4G connection. Further, the 4G eNB 12 could carry out this process separately for the UE's downlink data flow based on a comparison of determined spectral efficiencies of the downlinks of the UE's connections, and for the UE's uplink data flow based on a comparison of determined spectral efficiencies of the uplinks of the UE's connections.

In addition or as part of this process, based at least on the spectral-efficiency comparison, the 4G eNB 12 could also select and set one of the UE's connections as the UE's primary uplink path, such as by selecting and setting as the UE's primary uplink path the connection that has the highest determined spectral efficiency.

To facilitate this process, the 4G eNB 12 could determine respective spectral efficiencies of the UE's 4G connection and 5G connection, based on records of the spectral efficiency and/or records that establish the spectral efficiency. In practice, for instance, the 4G eNB 12 and 5G gNB 14 could each keep records tracking spectral efficiency respectively of each of the one or more cells on which they operate, and the 5G gNB 14 could report such records to the 4G eNB 12. Alternatively or additionally, the EMS 36 could track such per-cell spectral efficiency and could report the spectral efficiency to the 4G eNB 12, among other possibilities.

On a per-cell basis, for instance, these records could establish spectral efficiency as a measure of total bit rate served in the cell divided by frequency bandwidth of the cell. Further, the spectral efficiency of a given cell could be a measure of spectral efficiency for the cell generally (e.g., across all service in the cell) and could thus encompass both NSA and SA service in the cell and service as to one or more UEs other than the UE at issue. Measures of spectral efficiency of a given cell could also be rolled up over a sliding window of time, to establish a most recent representative spectral efficiency measure and/or could establish a representative measure of spectral efficiency for at a particular time of day based on historical performance at that time of day, any of which could be a basis for the analysis.

As noted above, at issue could be a comparison of (i) spectral efficiency of the 4G cell(s) on which the UE is connected with the 4G eNB 12 with (ii) spectral efficiency of the 5G cell(s) on which the UE is connected with the 5G gNB 14, possibly limiting the downlink or uplink focus to just those cells that would be used in practice for the UE's downlink or uplink service respectively. For instance, respectively for each of the UE's connections, the 4G eNB 12 could determine which cell(s) the UE is connected and operating on, and the 4G eNB 12 could determine an average or other rolled up measure of spectral efficiency of the determined cell(s). The 4G eNB 12 could then compare those determined levels of spectral efficiency of the UE's connections as a basis to set the UE's data split ratio and/or primary uplink path.

Further, as noted above, the 4G eNB 12 could consider additional factors in this process as well.

Figure 2:
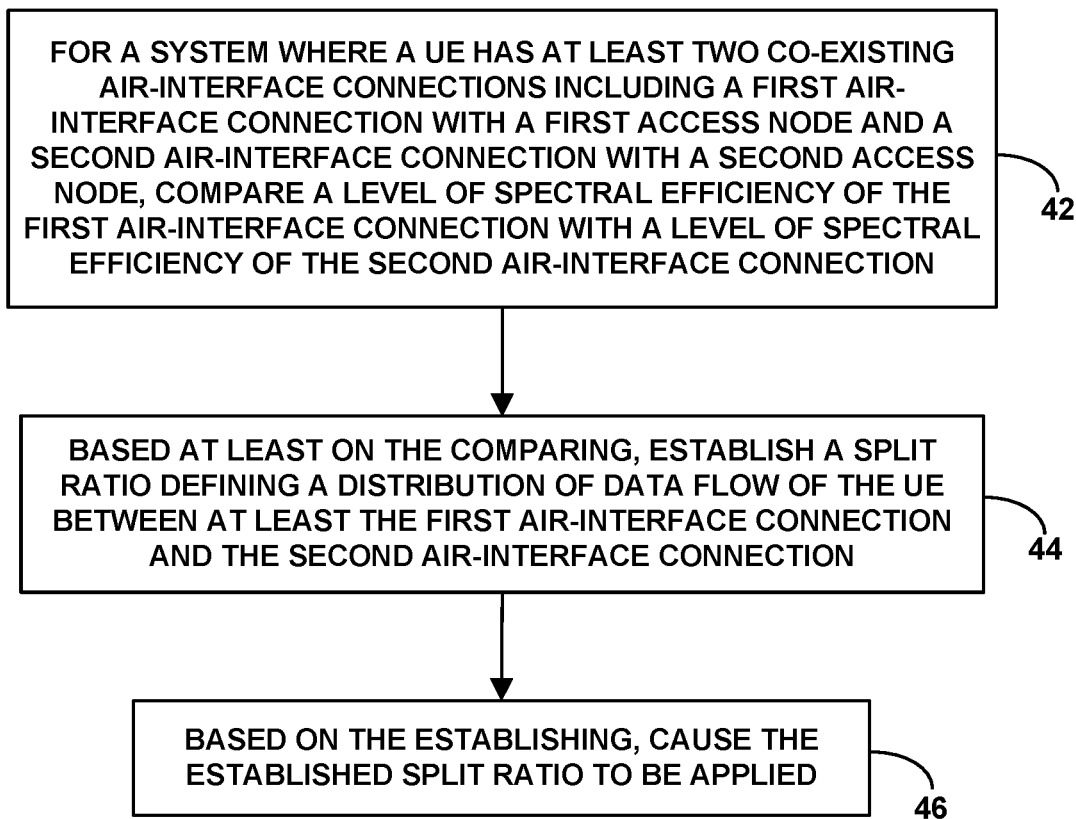
FIG. 2 is a flow chart depicting operations that can be carried out in accordance with the disclosure.

FIG. 2 is a flow chart depicting an example method that could be carried out in accordance with the present disclosure to control data split of a UE when the UE has at least two co-existing air-interface connections including a first air-interface connection with a first access node and a second air-interface connection with a second access node. As discussed above, this method could be carried out by a computing system, such as by at least one of the two access nodes for instance.

As shown in FIG. 2, at block 42, the example method includes comparing a level of spectral efficiency of the first air-interface connection with a level of spectral efficiency of the second air-interface connection. At block 44, the method then includes, based at least on the comparing, establishing a split ratio defining a distribution of data flow of the UE between at least the first air-interface connection and the second air-interface connection. And at block 46, the method includes, based on the establishing, causing the established split ratio to be applied.

In line with the discussion above, the split ratio at issue in this method could be an uplink split ratio and/or a downlink split ratio. Further, if the split ratio is an uplink split ratio, the act of causing the established split ratio to be applied could involve transmitting to the UE a directive that causes the UE to apply the established split ratio. And if the split ratio is a downlink split ratio, in a scenario where an entity splits the downlink data flow of the UE between the first and second connections, the act of causing the established split ratio to be applied could involve causing the entity to apply the established downlink split ratio.

As further discussed above, the method could additionally include (i) determining the level of spectral efficiency of the first air-interface connection based on spectral efficiency of one or more cells on which the first air-interface connection is defined and (ii) determining the level of spectral efficiency of the second air-interface connection based on spectral efficiency of one or more cells on which the second air-interface connection is defined. And the act of comparing the level of spectral efficiency of the first air-interface connection with the level of spectral efficiency of the second air-interface connection could involve comparing the determined level of spectral efficiency of the first air-interface connection with the determined level of spectral efficiency of the second air-interface connection.

Further, the act of establishing the split ratio based on the comparing of the determined level of spectral efficiency of the first air-interface connection with the determined level of spectral efficiency of the second air-interface connection could involve establishing the split ratio based on a ratio of (i) the determined level of spectral efficiency of the first air-interface connection to (ii) the determined level of spectral efficiency of the second air-interface connection. For instance, this could involve setting the split ratio to be equal to the ratio of (i) the determined level of spectral efficiency of the first air-interface connection to (ii) the determined level of spectral efficiency of the second air-interface connection.

Still further, the act of establishing the split ratio based on the comparing of the determined level of spectral efficiency of the first air-interface connection with the determined level of spectral efficiency of the second air-interface connection could involve (i) selecting one of the first and second air-interface connections based on the determined level of spectral efficiency of the selected air-interface connection being higher than the determined level of spectral efficiency of the other of the first and second air-interface connections and (ii) based on the selecting, establishing as the split ratio a split ratio that will put a majority of the data flow of the UE on the identified air-interface connection.

Figure 3:
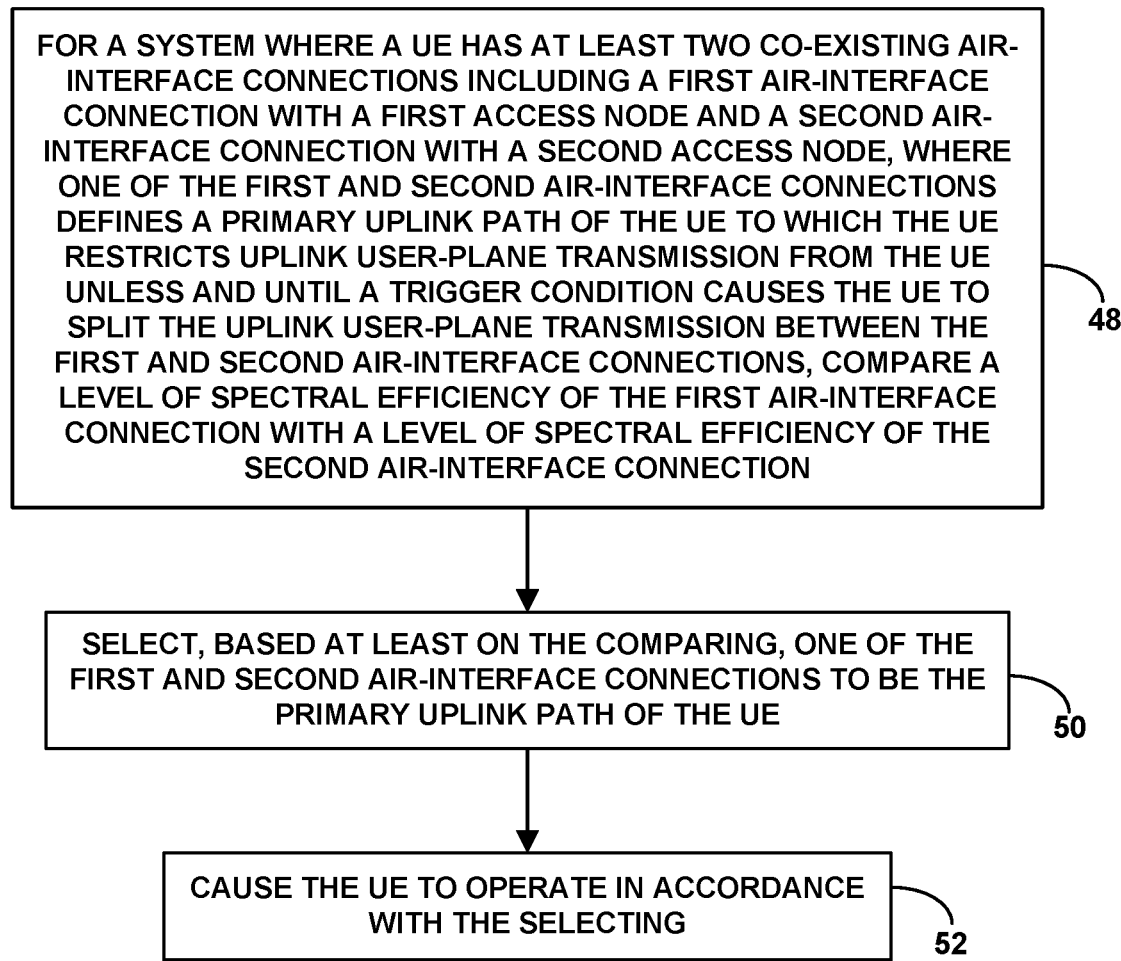
FIG. 3 is another flow chart depicting operations that can be carried out in accordance with the disclosure.

FIG. 3 is next a flow chart depicting an example method that could be carried out in accordance with the present disclosure to control uplink communication from a UE when the UE has at least two co-existing air-interface connections including a first air-interface connection with a first access node and a second air-interface connection with a second access node, where one of the first and second air-interface connections defines a primary uplink path of the UE to which the UE restricts uplink user-plane transmission from the UE unless and until a trigger condition causes the UE to split the uplink user-plane transmission between the first and second air-interface connections.

As shown in FIG. 3, at block 48, the method includes comparing a level of spectral efficiency of the first air-interface connection with a level of spectral efficiency of the second air-interface connection. At block 50, the method then includes selecting, based at least on the comparing, one of the first and second air-interface connections to be the primary uplink path of the UE. And at block 52, the method includes causing the UE to operate in accordance with the selecting.

In line with the discussion above, this method could be carried out by a given one of the access nodes. And the act of causing the UE to operate in accordance with the selecting could involve transmitting from the given access node to the UE a directive that causes the UE to use the selected air-interface connection as the primary uplink path of the UE.

Further, as discussed above, the act of selecting, based at least on the comparing, one of the first and second air-interface connections to be the primary uplink path of the UE could involve (i) determining, based on the comparing, that the level of spectral efficiency of the first air-interface connection is greater than the level of spectral efficiency of the second access node and (ii) based at least on the determining, selecting the first air-interface connection to be the primary uplink path of the UE.

In addition, as discussed above, the method as so defined could also involve (i) determining the level of spectral efficiency of the first air-interface connection based on spectral efficiency of one or more cells on which the first air-interface connection is defined and (ii) determining the level of spectral efficiency of the second air-interface connection based on spectral efficiency of one or more cells on which the second air-interface connection is defined. And in that case, the act of comparing the level of spectral efficiency of the first air-interface connection with the level of spectral efficiency of the second air-interface connection could likewise involve comparing the determined level of spectral efficiency of the first air-interface connection with the determined level of spectral efficiency of the second air-interface connection.

Various other features discussed herein can be implemented in this context as well, and vice versa.

Controlling the UE's Data Split Based on Per-Connection Fading

Another basis that the 4G eNB 12 could use for this dynamic control is a comparison of fading in the cells on which the UE is connected respectively with the 4G eNB 12 and with the 5G gNB 14.

Fading in a cell could be a measure of an extent to which UEs served in the cell tend to experience fluctuation in coverage quality of the cell over time, and particularly an extent to which the UEs tend to experience a degradation in such coverage quality over time. Fading could occur for various reasons, such as because UEs move farther away from the access node serving the cell and/or because of multipath interference or shadowing issues at various locations in the cell, among other possibilities. If UEs in a cell tend to experience a relatively high level of fading, that could represent a relatively undesirable context for serving any given UE in the cell, as the likelihood of fading could suggest a likelihood of degraded or unstable communication quality. Whereas if UEs in a cell tend to experience a relatively low level of fading, that could represent a relatively desirable context for serving any given UE in the cell.

Accordingly, the 4G eNB 12 could determine a level of fading associated with the UE's 4G connection as or otherwise based on fading experienced in the one or more 4G cells on which the UE is connected with the 4G eNB 12, and the 4G eNB 12 could determine a level of fading associated with the UE's 5G connection as or otherwise based on fading experienced in the one or more 5G cells on which the UE is connected with the 5G gNB 14. The 4G eNB 12 could then compare the determined level of fading associated with the UE's 4G connection with the determined level of fading associated with the UE's 5G connection. And based at least on that comparison, the 4G eNB 12 could determine and set a split ratio for the UE.

For instance, based at least on this comparison, the 4G eNB 12 could set a split ratio that puts a majority of the UE's data flow on the UE's connection that has the lowest determined level of fading, perhaps setting the split ratio to be equal to or otherwise based on an inverse of a ratio of the connections' respective determined levels of fading. For example, if the determined level of fading of the UE's 5G connection is twice that of the UE's 4G connection, then the 4G eNB 12 could set a split ratio that puts half as much of the UE's data flow on the UE's 5G connection as on the UE's 4G connection. Further, the 4G eNB 12 could carry out this process separately for the UE's downlink data flow based on a comparison of determined levels of fading of the downlinks of the UE's connections, and for the UE's uplink data flow based on a comparison of determined levels of fading of the uplinks of the UE's connections.

In addition or as part of this process, based at least on the fading comparison, the 4G eNB 12 could also select and set one of the UE's connections as the UE's primary uplink path, such as by selecting and setting as the UE's primary uplink path the connection that has the lowest determined level of fading.

To facilitate this process, the 4G eNB 12 could determine respective levels of fading of the UE's 4G connection and 5G connection, based on records of the levels of fading and/or records that establish the levels of fading. In practice, for instance, the 4G eNB 12 and 5G gNB 14 could each keep records tracking level of fading respectively in each of the one or more cells on which they operate, and the 5G gNB 14 could report such records to the 4G eNB 12. Alternatively or additionally, the EMS 36 could track such per-cell fading and could report the fading to the 4G eNB 12, among other possibilities.

On a per-cell basis, for instance, these records could establish fading as a statistically rolled up measure of fading experienced by UEs served in the cell. Further, the level of fading per cell could be a level of fading for the cell generally (e.g., across all service in the cell) and could thus encompass both NSA and SA service in the cell and service as to one or more UEs other than the UE at issue.

For instance, for each UE served in a given cell, the serving access node could keep timestamped records of the UE's coverage quality of the cell over time and the access node could compute a level of fading experienced by that UE as a rate of fluctuation of the UE's coverage quality of the cell over time—such as with a higher level of fading corresponding with greater rate and/or magnitude of change in coverage quality over time and a lower level of fading corresponding with lesser rate and/or magnitude of change in such coverage quality over time. And over a sliding window of time, the serving access node or other computing system could roll up the latest such levels of fading for multiple UEs served in the cell, to establish a latest representative measure of fading of the cell.

For instance, this could involve maintaining a running average of the most recently determined level of fading of UEs served in the cell, as a latest level of fading of the cell. Alternatively or additionally, this could involve establishing an historical such level of fading of the cell per time of day, to facilitate predicting what the level of fading of the cell is likely to be at a current time of day based on what the level of fading of the cell has been on past days at or around the same time of day for instance.

Further, this level of fading could be focused specifically on instances of coverage-quality fluctuation to or from a level of coverage quality that is deemed particularly poor, such as a predefined threshold low level of RSRP or CQI for instance. And the level of fading could be further focused on instances of coverage-quality fluctuation to a poor level of coverage quality, i.e., where coverage quality has degraded over time. The analysis could thus selectively omit other instances of coverage-quality variation.

As noted above, at issue could be a comparison of (i) level of fading of the 4G cell(s) on which the UE is connected with the 4G eNB 12 with (ii) level of fading of the 5G cell(s) on which the UE is connected with the 5G gNB 14, possibly limiting the downlink or uplink focus to just those cells that would be used in practice for the UE's downlink or uplink service respectively. For instance, respectively for each of the UE's connections, the 4G eNB 12 could determine which cell(s) the UE is connected and operating on, and the 4G eNB 12 could determine an average or other rolled up measure of level of fading of the determined cell(s). The 4G eNB 12 could then compare those determined levels of fading of the UE's connections as a basis to set the UE's data split ratio and/or primary uplink path.

Further, as noted above, the 4G eNB 12 could consider additional factors in this process as well.

Figure 4:
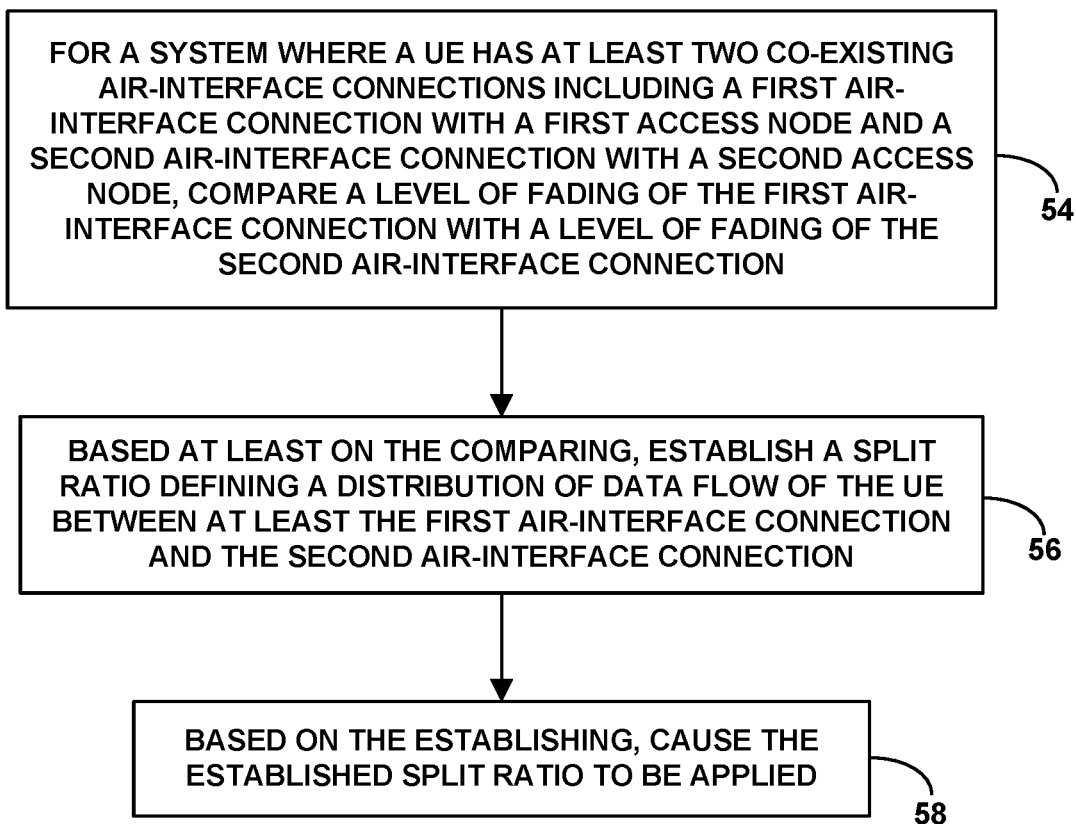
FIG. 4 is another flow chart depicting operations that can be carried out in accordance with the disclosure.

FIG. 4 is a flow chart depicting an example method that could be carried out in accordance with the present disclosure to control data split of a UE when the UE has at least two co-existing air-interface connections including a first air-interface connection with a first access node and a second air-interface connection with a second access node. As discussed above, this method could be carried out by a computing system, such as by at least one of the two access nodes for instance.

As shown in FIG. 4, at block 54, the example method includes comparing a level of fading of the first air-interface connection with a level of fading of the second air-interface connection. At block 56, the method then includes, based at least on the comparing, establishing a split ratio defining a distribution of data flow of the UE between at least the first air-interface connection and the second air-interface connection. And at block 58, the method includes, based on the establishing, causing the established split ratio to be applied.

In line with the discussion above, the split ratio at issue in this method could be an uplink split ratio and/or a downlink split ratio. Further, if the split ratio is an uplink split ratio, the act of causing the established split ratio to be applied could involve transmitting to the UE a directive that causes the UE to apply the established split ratio. And if the split ratio is a downlink split ratio, in a scenario where an entity splits the downlink data flow of the UE between the first and second connections, the act of causing the established split ratio to be applied could involve causing the entity to apply the established downlink split ratio.

As further discussed above, the method could additionally include (i) determining the level of fading of the first air-interface connection based on fading experienced in one or more cells on which the first air-interface connection is defined and (ii) determining the level of fading of the second air-interface connection based on fading experienced in one or more cells on which the second air-interface connection is defined. And the act of comparing the level of fading of the first air-interface connection with the level of fading of the second air-interface connection could involve comparing the determined level of fading of the first air-interface connection with the determined level of fading of the second air-interface connection.

Further, the act of establishing the split ratio based on the comparing of the determined level of fading of the first air-interface connection with the determined level of fading of the second air-interface connection could involve establishing the split ratio based on an inverse of a ratio of (i) the determined level of fading of the first air-interface connection to (ii) the determined level of fading of the second air-interface connection. For instance, this could involve setting the split ratio to be equal to the inverse of the ratio of (i) the determined level of fading of the first air-interface connection to (ii) the determined level of fading of the second air-interface connection.

Still further, the act of establishing the split ratio based on the comparing of the determined level of fading of the first air-interface connection with the determined level of fading of the second air-interface connection could involve (i) selecting one of the first and second air-interface connections based on the determined level of fading of the selected air-interface connection being less than the determined level of fading of the other of the first and second air-interface connections and (ii) based on the selecting, establishing as the split ratio a split ratio that will put a majority of the data flow of the UE on the identified air-interface connection.

Figure 5:
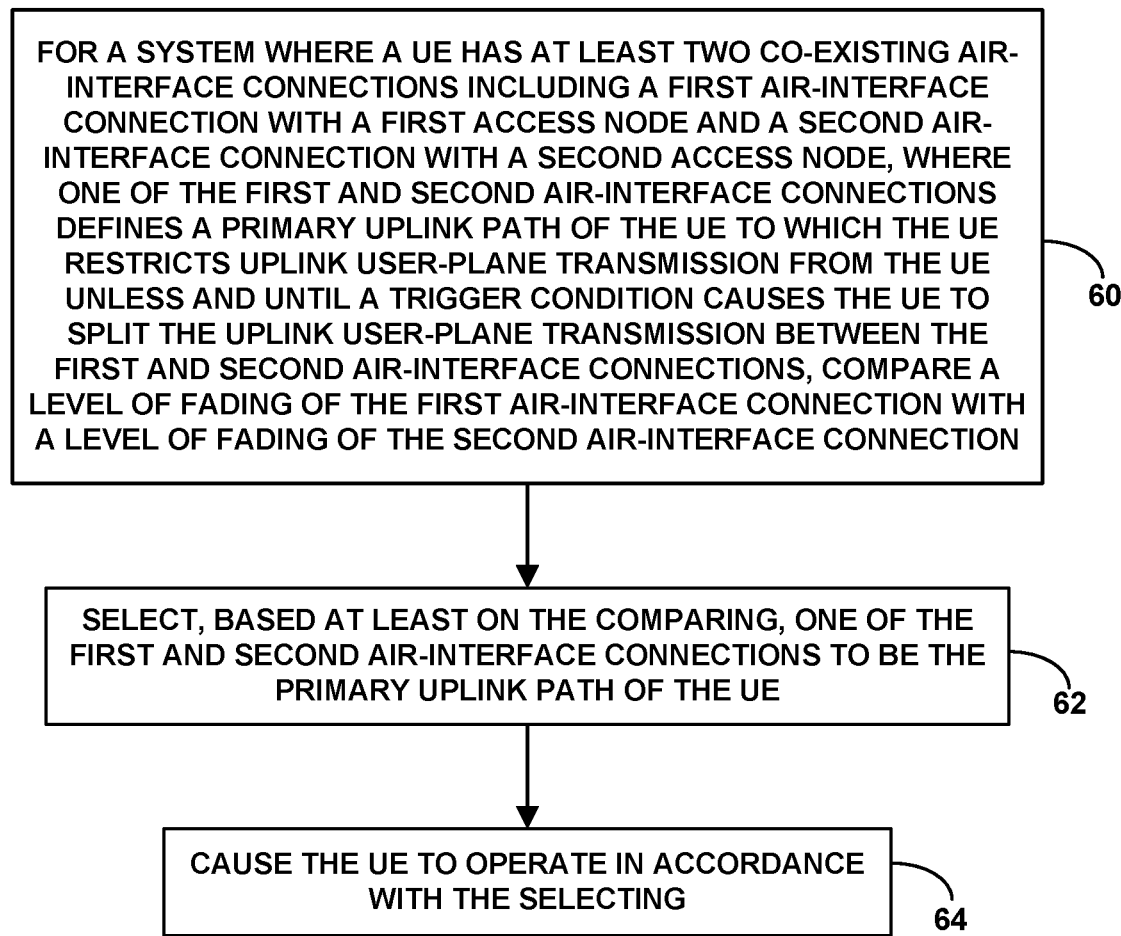
FIG. 5 is another flow chart depicting operations that can be carried out in accordance with the disclosure.

FIG. 5 is next a flow chart depicting an example method that could be carried out in accordance with the present disclosure to control uplink communication from a UE when the UE has at least two co-existing air-interface connections including a first air-interface connection with a first access node and a second air-interface connection with a second access node, where one of the first and second air-interface connections defines a primary uplink path of the UE to which the UE restricts uplink user-plane transmission from the UE unless and until a trigger condition causes the UE to split the uplink user-plane transmission between the first and second air-interface connections.

As shown in FIG. 5, at block 60, the method includes comparing a level of fading of the first air-interface connection with a level of fading of the second air-interface connection. At block 62, the method then includes selecting, based at least on the comparing, one of the first and second air-interface connections to be the primary uplink path of the UE. And at block 64, the method includes causing the UE to operate in accordance with the selecting.

In line with the discussion above, this method could be carried out by a given one of the access nodes. And the act of causing the UE to operate in accordance with the selecting could involve transmitting from the given access node to the UE a directive that causes the UE to use the selected air-interface connection as the primary uplink path of the UE.

Further, as discussed above, the act of selecting, based at least on the comparing, one of the first and second air-interface connections to be the primary uplink path of the UE could involve (i) determining, based on the comparing, that the level of fading of the first air-interface connection is less than the level of fading of the second access node and (ii) based at least on the determining, selecting the first air-interface connection to be the primary uplink path of the UE.

In addition, as discussed above, the method as so defined could also involve (i) determining the level of fading of the first air-interface connection based on fading experienced in one or more cells on which the first air-interface connection is defined and (ii) determining the level of fading of the second air-interface connection based on fading experienced in one or more cells on which the second air-interface connection is defined. And in that case, the act of comparing the level of fading of the first air-interface connection with the level of fading of the second air-interface connection could likewise involve comparing the determined level of fading of the first air-interface connection with the determined level of fading of the second air-interface connection.

Various other features discussed herein can be implemented in this context as well, and vice versa.

Controlling the UE's Data Split Based on Per-Connection Insertion Loss

Yet another basis that the 4G eNB 12 could use for this dynamic control is a comparison of insertion loss as to the cells on which UE is connected respectively with the 4G eNB 12 and with the 5G gNB 14.

Insertion loss per cell could define a loss in signal power resulting from the insertion of one or more devices in a transmission path serving communication in the cell. For instance, on a per-cell basis or generally, an access node could be configured with one or more RF filters, combiners, diplexers, triplexers, antenna ports, antennas, jumper cables, and other components that may cooperatively introduce signal loss of communications on the carrier. Further, if the access node is configured to provide service on multiple carriers, these components may introduce different levels of insertion loss as to different carriers, and/or different subsets of components may handle communications for different carriers and introduce different levels of insertion loss than each other. Insertion loss is undesirable, as it could degrade communication between the access node and the UE, which could result in retransmissions and overall lower throughput.

Accordingly, the 4G eNB 12 could determine insertion loss of the UE's 4G connection as or otherwise based on insertion loss at the 4G eNB 14 as to the one or more 4G cells on which the UE is connected with the 4G eNB 12, and the 4G eNB 12 could determine insertion loss of the UE's 5G connection as or otherwise based on insertion loss at the 5G gNB 14 as to the one or more 5G cells on which the UE is connected with the 5G gNB 14. The 4G eNB 12 could then compare the determined insertion loss of the UE's 4G connection with the determined insertion loss of the UE's 5G connection. And based at least on that comparison, the 4G eNB 12 could determine and set a split ratio for the UE.

For instance, based at least on this comparison, the 4G eNB 12 could set a split ratio that puts a majority of the UE's data flow on the UE's connection that has the lowest determined insertion loss, perhaps setting the split ratio to be equal to or otherwise based on an inverse of a ratio of the connections' respective determined levels of insertion loss. For example, if the determined insertion loss of the UE's 5G connection is twice that of the UE's 4G connection, then the 4G eNB 12 could set a split ratio that puts half as much of the UE's data flow on the UE's 5G connection as on the UE's 4G connection. Further, particularly if insertion loss would vary for downlink versus uplink, the 4G eNB 12 could carry out this process separately for the UE's downlink data flow based on a comparison of determined levels of insertion loss of the downlinks of the UE's connections, and for the UE's uplink data flow based on a comparison of determined levels of insertion loss of the uplinks of the UE's connections.

In addition or as part of this process, based at least on the insertion-loss comparison, the 4G eNB 12 could also select and set one of the UE's connections as the UE's primary uplink path, such as by selecting and setting as the UE's primary uplink path the connection that has the lowest determined insertion loss.

To facilitate this process, the 4G eNB 12 could be provisioned in advance with a specification of the insertion loss respectively of each cell on which the 4G eNB 12 provides service and also a specification of insertion loss respectively of each cell on which the 5G gNB 14 provides service, or the 4G eNB 12 could otherwise have access to that information. Engineering personnel and/or an automated system could measure this insertion loss respectively per cell at the time each cell is deployed or configured for operation and could update the measurements from time to time. The measured insertion loss could then be recorded in access-node profile data, to which the 4G eNB 12 could have access.

As noted above, at issue could be a comparison of (i) insertion loss of the 4G cell(s) on which the UE is connected with the 4G eNB 12 with (ii) insertion loss of the 5G cell(s) on which the UE is connected with the 5G gNB 14, possibly limiting the downlink or uplink focus to just those cells that would be used in practice for the UE's downlink or uplink service respectively. For instance, respectively for each of the UE's connections, the 4G eNB 12 could determine which cell(s) the UE is connected and operating on, and the 4G eNB 12 could determine an average or other rolled up measure of levels of insertion loss of the determined cell(s). The 4G eNB 12 could then compare those determined levels of insertion loss of the UE's connections as a basis to set the UE's data split ratio and/or primary uplink path.

Further, as noted above, the 4G eNB 12 could consider additional factors in this process as well.

Figure 6:
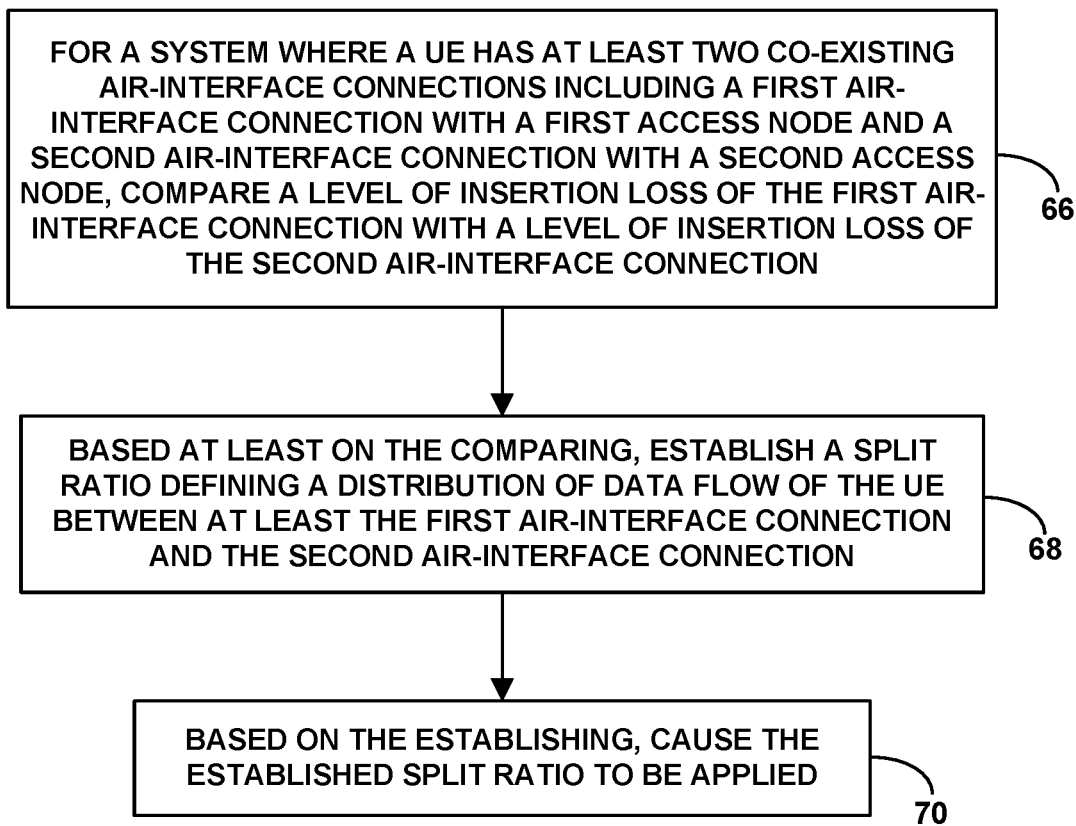
FIG. 6 is another flow chart depicting operations that can be carried out in accordance with the disclosure.

FIG. 6 is a flow chart depicting an example method that could be carried out in accordance with the present disclosure to control data split of a UE when the UE has at least two co-existing air-interface connections including a first air-interface connection with a first access node and a second air-interface connection with a second access node. As discussed above, this method could be carried out by a computing system, such as by at least one of the two access nodes for instance.

As shown in FIG. 6, at block 66, the example method includes comparing a level of insertion loss of the first air-interface connection with a level of insertion loss of the second air-interface connection. At block 68, the method then includes, based at least on the comparing, establishing a split ratio defining a distribution of data flow of the UE between at least the first air-interface connection and the second air-interface connection. And at block 70, the method includes, based on the establishing, causing the established split ratio to be applied.

In line with the discussion above, the split ratio at issue in this method could be an uplink split ratio and/or a downlink split ratio. Further, if the split ratio is an uplink split ratio, the act of causing the established split ratio to be applied could involve transmitting to the UE a directive that causes the UE to apply the established split ratio. And if the split ratio is a downlink split ratio, in a scenario where an entity splits the downlink data flow of the UE between the first and second connections, the act of causing the established split ratio to be applied could involve causing the entity to apply the established downlink split ratio.

As further discussed above, the method could additionally include (i) determining the level of insertion loss of the first air-interface connection based on insertion loss at the first access node as to one or more cells on which the first air-interface connection is defined and (ii) determining the level of insertion loss of the second air-interface connection based on insertion loss at the second access node as to one or more cells on which the second air-interface connection is defined. And the act of comparing the level of insertion loss of the first air-interface connection with the level of insertion loss of the second air-interface connection could involve comparing the determined level of insertion loss of the first air-interface connection with the determined level of insertion loss of the second air-interface connection.

Further, the act of establishing the split ratio based on the comparing of the determined level of insertion loss of the first air-interface connection with the determined level of insertion loss of the second air-interface connection could involve establishing the split ratio based on an inverse of a ratio of (i) the determined level of insertion loss of the first air-interface connection to (ii) the determined level of insertion loss of the second air-interface connection. For instance, this could involve setting the split ratio to be equal to the inverse of the ratio of (i) the determined level of insertion loss of the first air-interface connection to (ii) the determined level of insertion loss of the second air-interface connection.

Still further, the act of establishing the split ratio based on the comparing of the determined level of insertion loss of the first air-interface connection with the determined level of insertion loss of the second air-interface connection could involve (i) selecting one of the first and second air-interface connections based on the determined level of insertion loss of the selected air-interface connection being less than the determined level of insertion loss of the other of the first and second air-interface connections and (ii) based on the selecting, establishing as the split ratio a split ratio that will put a majority of the data flow of the UE on the identified air-interface connection.

Figure 7:
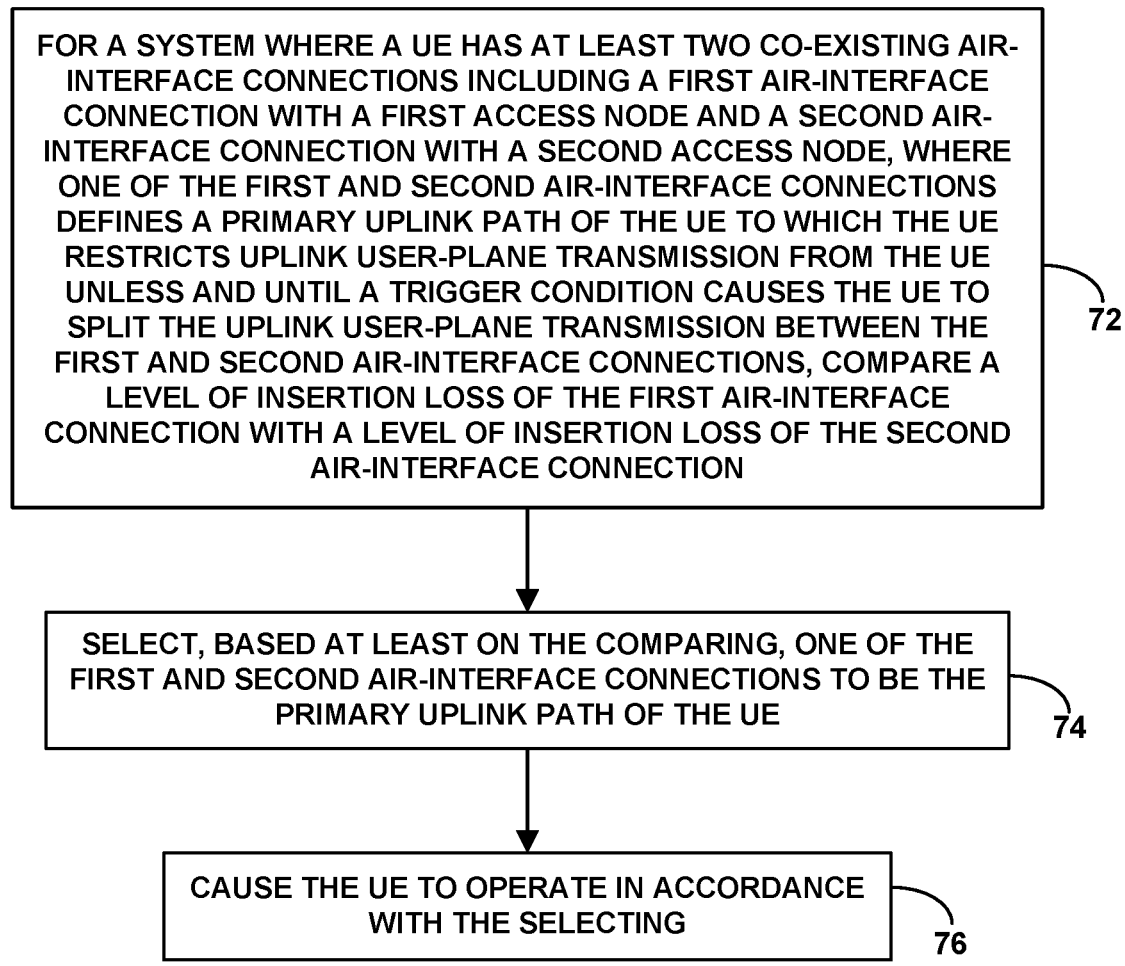
FIG. 7 is another flow chart depicting operations that can be carried out in accordance with the disclosure.

FIG. 7 is next a flow chart depicting an example method that could be carried out in accordance with the present disclosure to control uplink communication from a UE when the UE has at least two co-existing air-interface connections including a first air-interface connection with a first access node and a second air-interface connection with a second access node, where one of the first and second air-interface connections defines a primary uplink path of the UE to which the UE restricts uplink user-plane transmission from the UE unless and until a trigger condition causes the UE to split the uplink user-plane transmission between the first and second air-interface connections.

As shown in FIG. 7, at block 72, the method includes comparing a level of insertion loss of the first air-interface connection with a level of insertion loss of the second air-interface connection. At block 74, the method then includes selecting, based at least on the comparing, one of the first and second air-interface connections to be the primary uplink path of the UE. And at block 76, the method includes causing the UE to operate in accordance with the selecting.

In line with the discussion above, this method could be carried out by a given one of the access nodes. And the act of causing the UE to operate in accordance with the selecting could involve transmitting from the given access node to the UE a directive that causes the UE to use the selected air-interface connection as the primary uplink path of the UE.

Further, as discussed above, the act of selecting, based at least on the comparing, one of the first and second air-interface connections to be the primary uplink path of the UE could involve (i) determining, based on the comparing, that the level of insertion loss of the first air-interface connection is less than the level of insertion loss of the second access node and (ii) based at least on the determining, selecting the first air-interface connection to be the primary uplink path of the UE.

In addition, as discussed above, the method as so defined could also involve (i) determining the level of insertion loss of the first air-interface connection based on insertion loss at the first access node as to one or more cells on which the first air-interface connection is defined and (ii) determining the level of insertion loss of the second air-interface connection based on insertion loss at the second access node as to one or more cells on which the second air-interface connection is defined. And in that case, the act of comparing the level of insertion loss of the first air-interface connection with the level of insertion loss of the second air-interface connection could likewise involve comparing the determined level of insertion loss of the first air-interface connection with the determined level of insertion loss of the second air-interface connection.

Various other features discussed herein can be implemented in this context as well, and vice versa.

Controlling the UE's Data Split Based on Per-Connection Beamforming Support

Still another basis for that the 4G eNB 12 could use for this dynamic control is a comparison of beamforming support on the UE's 4G connection with beamforming support on the UE's 5G connection.

Beamforming involves an access node focusing a targeted beam of electromagnetic energy specifically to the UE, as compared with the access node radiating generally throughout the access node's area of coverage. For instance, an access node might beamform to a UE by implementing an antenna array that has multiple antenna elements and programmatically setting the phase and amplitude respectively of various antenna elements so that transmissions from the antenna elements constructively or destructively combine to produce a beam in the direction of the UE. Beamforming to a UE could thereby help to improve the access node's antenna gain and associated transmission quality and throughput experienced by the UE, and could help to reduce interference to other UEs, which may lead to overall improved resource availability and other benefits.

In practice, different cells on which a UE is served may have different levels of beamforming support than each other, based on various factors such as differences in physical access-node equipment (e.g., antenna elements) and/or differences in program logic per cell, as well as differences per band, RAT, or other aspect of UE support for such beamforming, among other possibilities. By way of example, one cell may support beamforming to the UE, but another cell may not support beamforming to the UE. As another example, one cell may support both single-beam beamforming to the UE and more robust dual-beam beamforming to the UE, but the another cell may support just single-beam beamforming to the UE. And as yet another example, one cell may support beamforming to the UE with up to a high degree of accuracy to provide more powerful and robust communication, but another cell may support beamforming with just a lower level of accuracy (e.g., with a less narrow beam).

While the level of beamforming support per cell may not be a measurement per se, it could be quantified. For instance, the level of beamforming support per cell could be represented as a binary, Boolean value indicating whether or not the cell supports beamforming to the UE, such as by assigning a value of 1 (one) to a cell that supports beamforming and assigning a value of 0 (zero) to a cell that does not support beamforming to the UE. Further, the level of beamforming support per cell could be more granularly quantified as well. For instance, a cell's level of beamforming support could be represented by a weighted score based on positive factors such as (i) the cell supporting beamforming to the UE, (ii) the cell supporting dual-beam beamforming to the UE, (iii) the narrowness of beamforming supported by the cell, among other possibilities, with weights being a matter of engineering design choice, and (iv) the extent to which the UE supports the beamforming.

Accordingly, the 4G eNB 12 could determine a level of beamforming support of the UE's 4G connection as or otherwise based on beamforming support of the one or more 4G cells on which the UE is connected with the 4G eNB 12, and the 4G eNB 12 could determine a level of beamforming support of the UE's 5G connection as or otherwise based on beamforming support of the one or more 5G cells on which the UE is connected with the 5G gNB 14. The 4G eNB 12 could then compare the determined level of beamforming support of the UE's 4G connection with the determined level of beamforming support of the UE's 5G connection. And based at least on that comparison, the 4G eNB 12 could determine and set a split ratio for the UE.

For instance, based at least on this comparison, the 4G eNB 12 could set a split ratio that puts a majority of the UE's data flow on the UE's connection that has the highest determined level of beamforming support, perhaps setting the split ratio to be equal to or otherwise based on ratio of the connections' respective determined levels of beamforming support. For example, if the determined beamforming support of the UE's 5G connection is twice that of the UE's 4G connection, then the 4G eNB 12 could set a split ratio that puts twice as much of the UE's data flow on the UE's 5G connection as on the UE's 4G connection. Further, as to downlink beamforming, the 4G eNB 12 could carry out this process specifically for the UE's downlink data split. And if uplink beamforming is supported, the 4G eNB 12 may carry out an analogous process for the UE's uplink data split.

To facilitate this process, the 4G eNB 12 could determine respective levels of beamforming support of the UE's 4G connection and 5G connection, based on records of the levels of beamforming support and/or records that establish the levels of beamforming support. In practice, for instance, the 4G eNB 12 and 5G gNB 14 could each keep such records respectively for each of the one or more cells on which they serve the UE, and the 5G gNB 14 could report such records to the 4G eNB 12.

As noted above, at issue could be a comparison of (i) beamforming support of the 4G cell(s) on which the UE is connected with the 4G eNB 12 with (ii) beamforming support of the 5G cell(s) on which the UE is connected with the 5G gNB 14. For instance, respectively for each of the UE's connections, the 4G eNB 12 could determine which cell(s) the UE is connected and operating on, and the 4G eNB 12 could determine an average or other rolled up measure of level of beamforming support of the determined cell(s). The 4G eNB 12 could then compare those determined levels of beamforming support of the UE's connections as a basis to set the UE's data split ratio and/or primary uplink path.

Further, as noted above, the 4G eNB 12 could consider additional factors in this process as well.

Figure 8:
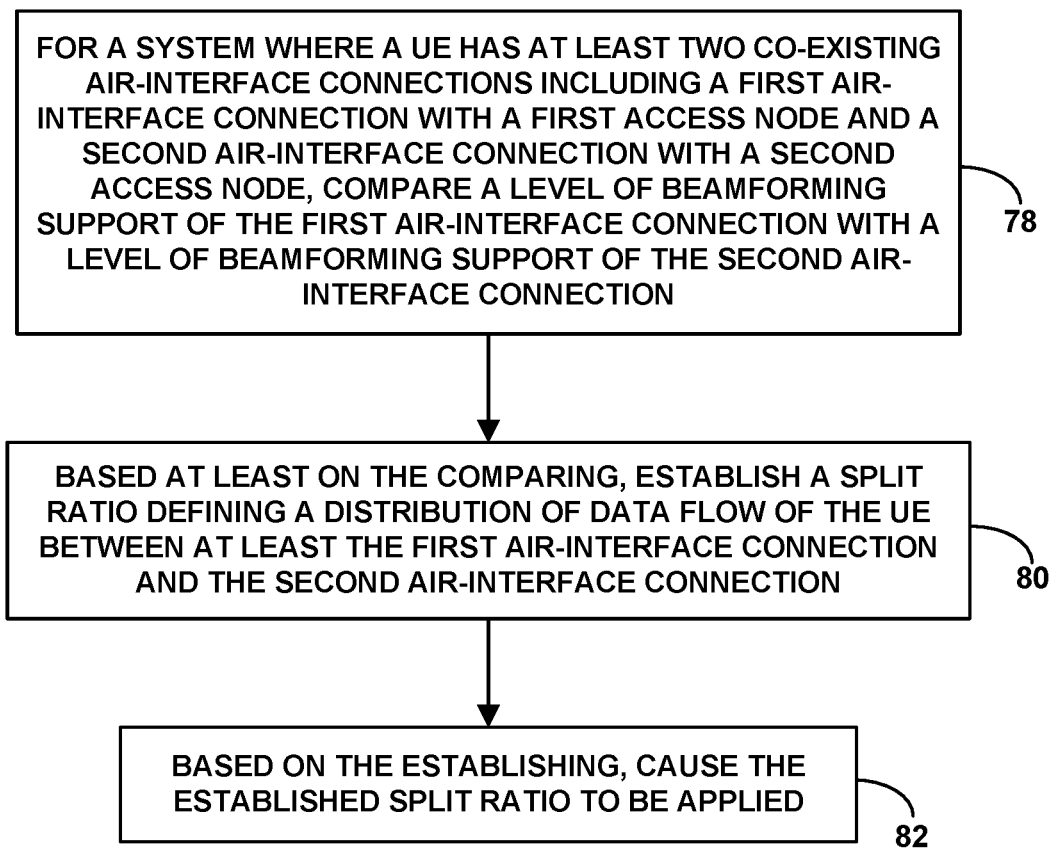
FIG. 8 is another flow chart depicting operations that can be carried out in accordance with the disclosure.

FIG. 8 is a flow chart depicting an example method that could be carried out in accordance with the present disclosure to control data split of a UE when the UE has at least two co-existing air-interface connections including a first air-interface connection with a first access node and a second air-interface connection with a second access node. As discussed above, this method could be carried out by a computing system, such as by at least one of the two access nodes for instance.

As shown in FIG. 8, at block 78, the example method includes comparing a level of beamforming support of the first air-interface connection with a level of beamforming support of the second air-interface connection. At block 80, the method then includes, based at least on the comparing, establishing a split ratio defining a distribution of data flow of the UE between at least the first air-interface connection and the second air-interface connection. And at block 82, the method includes, based on the establishing, causing the established split ratio to be applied.

In line with the discussion above, the split ratio at issue in this method could be an uplink split ratio and/or a downlink split ratio. Further, if the split ratio is an uplink split ratio, the act of causing the established split ratio to be applied could involve transmitting to the UE a directive that causes the UE to apply the established split ratio. And if the split ratio is a downlink split ratio, in a scenario where an entity splits the downlink data flow of the UE between the first and second connections, the act of causing the established split ratio to be applied could involve causing the entity to apply the established downlink split ratio.

As further discussed above, the method could additionally include (i) determining the level of beamforming support of the first air-interface connection based on beamforming support of one or more cells on which the first air-interface connection is defined and (ii) determining the level of beamforming support of the second air-interface connection based on beamforming support of one or more cells on which the second air-interface connection is defined. And the act of comparing the level of beamforming support of the first air-interface connection with the level of beamforming support of the second air-interface connection could involve comparing the determined level of beamforming support of the first air-interface connection with the determined level of beamforming support of the second air-interface connection.

Further, the act of establishing the split ratio based on the comparing of the determined level of beamforming support of the first air-interface connection with the determined level of beamforming support of the second air-interface connection could involve establishing the split ratio based on a ratio of (i) the determined level of beamforming support of the first air-interface connection to (ii) the determined level of beamforming support of the second air-interface connection. For instance, this could involve setting the split ratio to be equal to the ratio of (i) the determined level of beamforming support of the first air-interface connection to (ii) the determined level of beamforming support of the second air-interface connection.

Still further, the act of establishing the split ratio based on the comparing of the determined level of beamforming support of the first air-interface connection with the determined level of beamforming support of the second air-interface connection could involve (i) selecting one of the first and second air-interface connections based on the determined level of beamforming support of the selected air-interface connection being higher than the determined level of beamforming support of the other of the first and second air-interface connections and (ii) based on the selecting, establishing as the split ratio a split ratio that will put a majority of the data flow of the UE on the identified air-interface connection.

Figure 9:
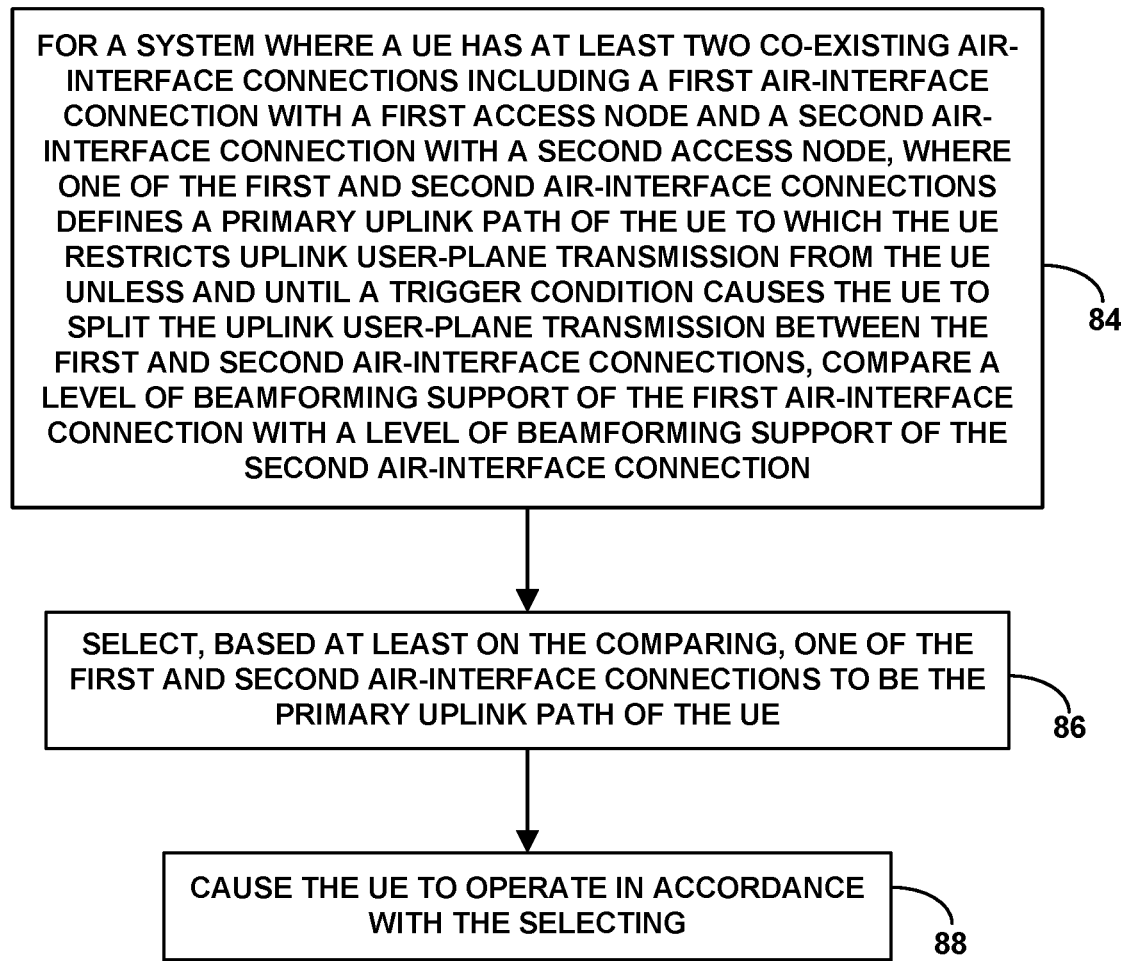
FIG. 9 is another flow chart depicting operations that can be carried out in accordance with the disclosure.

FIG. 9 is next a flow chart depicting an example method that could be carried out in accordance with the present disclosure to control uplink communication from a UE when the UE has at least two co-existing air-interface connections including a first air-interface connection with a first access node and a second air-interface connection with a second access node, where one of the first and second air-interface connections defines a primary uplink path of the UE to which the UE restricts uplink user-plane transmission from the UE unless and until a trigger condition causes the UE to split the uplink user-plane transmission between the first and second air-interface connections.

As shown in FIG. 9, at block 84, the method includes comparing a level of beamforming support of the first air-interface connection with a level of beamforming support of the second air-interface connection. At block 86, the method then includes selecting, based at least on the comparing, one of the first and second air-interface connections to be the primary uplink path of the UE. And at block 88, the method includes causing the UE to operate in accordance with the selecting.

In line with the discussion above, this method could be carried out by a given one of the access nodes. And the act of causing the UE to operate in accordance with the selecting could involve transmitting from the given access node to the UE a directive that causes the UE to use the selected air-interface connection as the primary uplink path of the UE.

Further, as discussed above, the act of selecting, based at least on the comparing, one of the first and second air-interface connections to be the primary uplink path of the UE could involve (i) determining, based on the comparing, that the level of beamforming support of the first air-interface connection is greater than the level of beamforming support of the second access node and (ii) based at least on the determining, selecting the first air-interface connection to be the primary uplink path of the UE.

In addition, as discussed above, the method as so defined could also involve (i) determining the level of beamforming support of the first air-interface connection based on beamforming support of one or more cells on which the first air-interface connection is defined and (ii) determining the level of beamforming support of the second air-interface connection based on beamforming support of one or more cells on which the second air-interface connection is defined. And in that case, the act of comparing the level of beamforming support of the first air-interface connection with the level of beamforming support of the second air-interface connection could likewise involve comparing the determined level of beamforming support of the first air-interface connection with the determined level of beamforming support of the second air-interface connection.

Various other features discussed herein can be implemented in this context as well, and vice versa.

Controlling the UE's Data Split Based on Per-Connection MIMO Support

Yet further, another basis that the 4G eNB 12 could use for this dynamic control is a comparison of MIMO support on the UE's 4G connection with MIMO support on the UE's 5G connection.

MIMO involves air-interface communication occurring concurrently on multiple different RF propagation paths—e.g., multiple beams—between the access node and the UE, from multiple transmit-antennas at the transmitting end (e.g., at the access node or UE) to multiple receive-antennas at the receiving end (e.g., at the UE or the access node). For instance, with spatial multiplexing, when the transmitting end has data to transmit to the receiving end, the transmitting end could multiplex the onto multiple antenna output ports and thus onto multiple RF propagation paths possibly on the same PRBs as each other, with each propagation path being referred to as a MIMO "layer". MIMO service could thus be characterized by how many how many transmit and receive antennas are used, for instance as 2×2 MIMO where both ends use two antennas or as 4×4 MIMO where both ends use 4 antennas.

A dual-connected UE's multiple connections may have different levels of MIMO support, which could be defined as or otherwise based on a maximum number of MIMO layers on which the UE can be served on the connection. The maximum number of MIMO layers on which a UE can be served on a connection could be based on various factors such as physical equipment (e.g., antenna-array size) and/or program logic at the serving access node and/or load issues. Further, the maximum number of supported MIMO layers on which a UE can be served on a connection could also be based on the UE's channel quality, perhaps as indicated by a rank-index (RI) report from the UE, and based on UE capability data defining a maximum number of supported MIMO layers, among other possibilities.

Accordingly, the 4G eNB 12 could determine a level of MIMO support of the UE's 4G connection as or otherwise based on the maximum number of MIMO layers on which the UE can be served on the 4G connection, and the 4G eNB 12 could determine a level of MIMO support of the UE's 5G connection as or otherwise based on the maximum number of MIMO layers on which the UE can be served on the 5G connection. The 4G eNB 12 could then compare the determined level of MIMO support of the UE's 4G connection with the determined level of MIMO support of the UE's 5G connection. And based at least on that comparison, the 4G eNB 12 could determine and set a split ratio for the UE.

For instance, based at least on this comparison, the 4G eNB 12 could set a split ratio that puts a majority of the UE's data flow on the UE's connection that has the highest determined level of MIMO support, perhaps setting the split ratio to be equal to or otherwise based on a ratio of the connections' respective determined levels of MIMO support. For example, if the determined level of MIMO support of the UE's 5G connection is twice that of the UE's 4G connection, then the 4G eNB 12 could set a split ratio that puts twice as much of the UE's data flow on the UE's 5G connection as on the UE's 4G connection. Further, the 4G eNB 12 could carry out this process separately for the UE's downlink data flow based on a comparison of determined MIMO support as to the downlinks of the UE's connections, and for the UE's uplink data flow based on a comparison of determined MIMO support as to the uplinks of the UE's connections.

In addition or as part of this process, based at least on the MIMO-support comparison, the 4G eNB 12 could also select and set one of the UE's connections as the UE's primary uplink path, such as by selecting and setting as the UE's primary uplink path the connection that has the highest determined level of MIMO support.

To facilitate this process, the 4G eNB 12 could determine respective levels of MIMO support of the UE's 4G connection and 5G connection, based on records of the levels MIMO support and/or records that establish the levels of MIMO support. In practice, for instance, the 4G eNB 12 and 5G gNB 14 could each keep a record of the maximum number of MIMO layers on which the UE can be served on their respective connection with the UE, based on factors such as those noted above, among other possibilities. And the 5G gNB 14 could report such records to the 4G eNB 12. Alternatively or additionally, the EMS 36 could track the UE's per-connection level of MIMO support and could report the levels of MIMO support to the 4G eNB 12, among other possibilities. The 4G eNB 12 could then compare those determined levels of MIMO support of the UE's connections as a basis to set the UE's data split ratio and/or primary uplink path.

Further, as noted above, the 4G eNB 12 could consider additional factors in this process as well.

Figure 10:
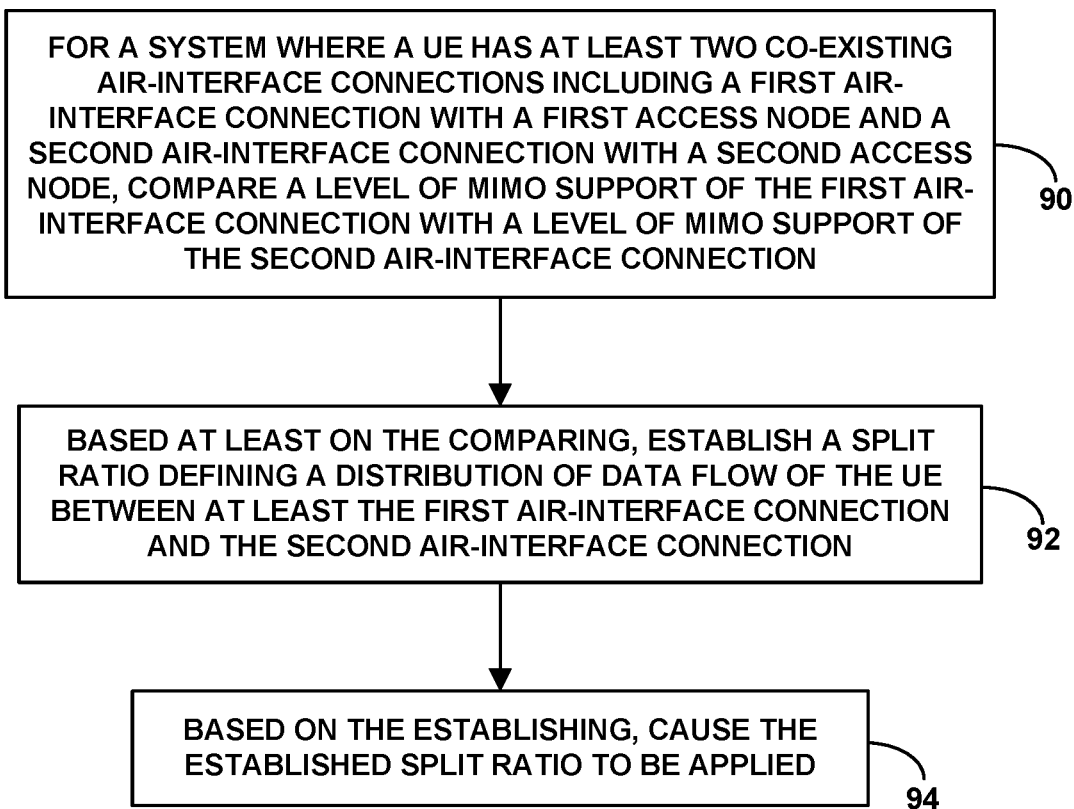
FIG. 10 is another flow chart depicting operations that can be carried out in accordance with the disclosure.

FIG. 10 is a flow chart depicting an example method that could be carried out in accordance with the present disclosure to control data split of a UE when the UE has at least two co-existing air-interface connections including a first air-interface connection with a first access node and a second air-interface connection with a second access node. As discussed above, this method could be carried out by a computing system, such as by at least one of the two access nodes for instance.

As shown in FIG. 10, at block 90, the example method includes comparing a level of MIMO support of the first air-interface connection with a level of MIMO support of the second air-interface connection. At block 92, the method then includes, based at least on the comparing, establishing a split ratio defining a distribution of data flow of the UE between at least the first air-interface connection and the second air-interface connection. And at block 94, the method includes, based on the establishing, causing the established split ratio to be applied.

In line with the discussion above, the split ratio at issue in this method could be an uplink split ratio and/or a downlink split ratio. Further, if the split ratio is an uplink split ratio, the act of causing the established split ratio to be applied could involve transmitting to the UE a directive that causes the UE to apply the established split ratio. And if the split ratio is a downlink split ratio, in a scenario where an entity splits the downlink data flow of the UE between the first and second connections, the act of causing the established split ratio to be applied could involve causing the entity to apply the established downlink split ratio.

As further discussed above, the method could additionally include (i) determining the level of MIMO support of the first air-interface connection based on a maximum number of MIMO layers on which the UE can be served on the first air-interface connection and (ii) determining the level of MIMO support of the second air-interface connection based on a maximum number of MIMO layers on which the UE can be served on the second air-interface connection. And the act of comparing the level of MIMO support of the first air-interface connection with the level of MIMO support of the second air-interface connection could involve comparing the determined level of MIMO support of the first air-interface connection with the determined level of MIMO support of the second air-interface connection.

Further, the act of establishing the split ratio based on the comparing of the determined level of MIMO support of the first air-interface connection with the determined level of MIMO support of the second air-interface connection could involve establishing the split ratio based on a ratio of (i) the determined level of MIMO support of the first air-interface connection to (ii) the determined level of MIMO support of the second air-interface connection. For instance, this could involve setting the split ratio to be equal to the ratio of (i) the determined level of MIMO support of the first air-interface connection to (ii) the determined level of MIMO support of the second air-interface connection.

Still further, the act of establishing the split ratio based on the comparing of the determined level of MIMO support of the first air-interface connection with the determined level of MIMO support of the second air-interface connection could involve (i) selecting one of the first and second air-interface connections based on the determined level of MIMO support of the selected air-interface connection being higher than the determined level of MIMO support of the other of the first and second air-interface connections and (ii) based on the selecting, establishing as the split ratio a split ratio that will put a majority of the data flow of the UE on the identified air-interface connection.

Figure 11:
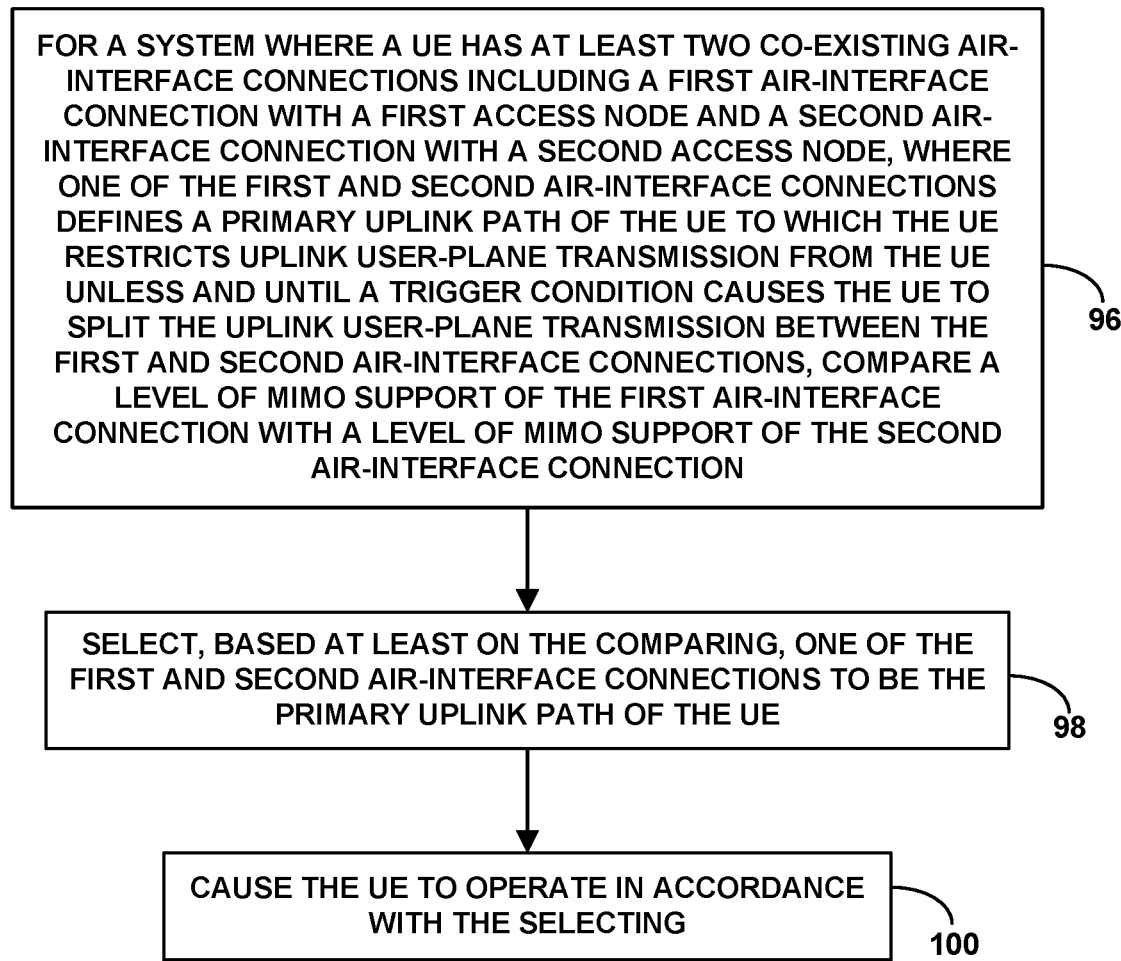
FIG. 11 is another flow chart depicting operations that can be carried out in accordance with the disclosure.

FIG. 11 is next a flow chart depicting an example method that could be carried out in accordance with the present disclosure to control uplink communication from a UE when the UE has at least two co-existing air-interface connections including a first air-interface connection with a first access node and a second air-interface connection with a second access node, where one of the first and second air-interface connections defines a primary uplink path of the UE to which the UE restricts uplink user-plane transmission from the UE unless and until a trigger condition causes the UE to split the uplink user-plane transmission between the first and second air-interface connections.

As shown in FIG. 11, at block 96, the method includes comparing a level of MIMO support of the first air-interface connection with a level of MIMO support of the second air-interface connection. At block 98, the method then includes selecting, based at least on the comparing, one of the first and second air-interface connections to be the primary uplink path of the UE. And at block 100, the method includes causing the UE to operate in accordance with the selecting.

In line with the discussion above, this method could be carried out by a given one of the access nodes. And the act of causing the UE to operate in accordance with the selecting could involve transmitting from the given access node to the UE a directive that causes the UE to use the selected air-interface connection as the primary uplink path of the UE.

Further, as discussed above, the act of selecting, based at least on the comparing, one of the first and second air-interface connections to be the primary uplink path of the UE could involve (i) determining, based on the comparing, that the level of MIMO support of the first air-interface connection is greater than the level of MIMO support of the second access node and (ii) based at least on the determining, selecting the first air-interface connection to be the primary uplink path of the UE.

In addition, as discussed above, the method as so defined could also involve (i) determining the level of MIMO support of the first air-interface connection based on a maximum number of MIMO layers on which the UE can be served on the first air-interface connection and (ii) determining the level of MIMO support of the second air-interface connection based on a maximum number of MIMO layers on which the UE can be served on the second air-interface connection. And in that case, the act of comparing the level of MIMO support of the first air-interface connection with the level of MIMO support of the second air-interface connection could likewise involve comparing the determined level of MIMO support of the first air-interface connection with the determined level of MIMO support of the second air-interface connection.

Various other features discussed herein can be implemented in this context as well, and vice versa.

Controlling the UE's Data Split Based on Per-Connection Frequency Bandwidth

Still further, another basis that the 4G eNB 12 could use for this dynamic control is a comparison of the aggregate frequency bandwidth respectively of the UE's connections, evaluated as to downlink and/or uplink channel bandwidth.

Each of the UE's connections, defined on one or more cells, would have an aggregate frequency bandwidth as the total frequency bandwidth across the one or more cells. For instance, if the UE is connected on just a 20 MHz wide carrier, then the UE's aggregate frequency bandwidth of that connection may be 20 MHz. Whereas if the UE is connected on both a 20 MHz carrier and a 15 MHz carrier, then the UE's aggregate frequency bandwidth of the connection may be 35 MHz. Variations and exclusions could be applied as well. In general, the greater the aggregate frequency bandwidth of a connection, the higher the UE's peak data rate could be on that connection, which would be more desirable.

Accordingly, the 4G eNB 12 could determine the aggregate bandwidth of the UE's 4G connection, and the 4G eNB 12 could determine the aggregate bandwidth of the UE's 5G connection. The 4G eNB 12 could then compare the determined aggregate bandwidth of the UE's 4G connection with the determined aggregate bandwidth of the UE's 5G connection. And based at least on that comparison, the 4G eNB 12 could determine and set a split ratio for the UE.

For instance, based at least on this comparison, the 4G eNB 12 could set a split ratio that puts a majority of the UE's data flow on the UE's connection that has the greatest aggregate bandwidth, perhaps setting the split ratio to be equal to or otherwise based on a ratio of the connections' respective aggregate bandwidths. For example, if the determined aggregate bandwidth of the UE's 5G connection is twice that of the UE's 4G connection, then the 4G eNB 12 could set a split ratio that puts twice as much of the UE's data flow on the UE's 5G connection as on the UE's 4G connection. Further, the 4G eNB 12 could carry out this process separately for the UE's downlink data flow based on a comparison of determined aggregate bandwidths of the downlinks of the UE's connections, and for the UE's uplink data flow based on a comparison of determined aggregate bandwidths of the uplinks of the UE's connections.

In addition or as part of this process, based at least on the aggregate-bandwidth comparison, the 4G eNB 12 could also select and set one of the UE's connections as the UE's primary uplink path, such as by selecting and setting as the UE's primary uplink path the connection that has the greatest determined aggregate bandwidth.

To facilitate this process, the 4G eNB 12 could determine respective aggregate bandwidths of the UE's 4G connection and 5G connection, based on records of the carriers and associated carrier bandwidths encompassed by each connection. For instance, the 4G eNB 12 may have stored in a context record for the UE a record of the one or more 4G carriers on which the UE is connected with the 4G eNB 12 and of the frequency channel bandwidth (e.g., downlink and/or uplink) respectively of each such carrier. Further, the 4G eNB 12 may also have stored in that context record and/or may determine through signaling with the 5G eNB 14 a record of the one or more 5G carriers on which the UE is connected with the 5G gNB 14 and likewise of the frequency channel bandwidth respectively of each such carrier. The 4G eNB 12 could thus refer to those records to compute or otherwise determine the aggregate bandwidth of the UE's 4G connection and the aggregate bandwidth of the UE's 5G connection.

Further, as noted above, the 4G eNB 12 could consider additional factors in this process as well.

Figure 12:
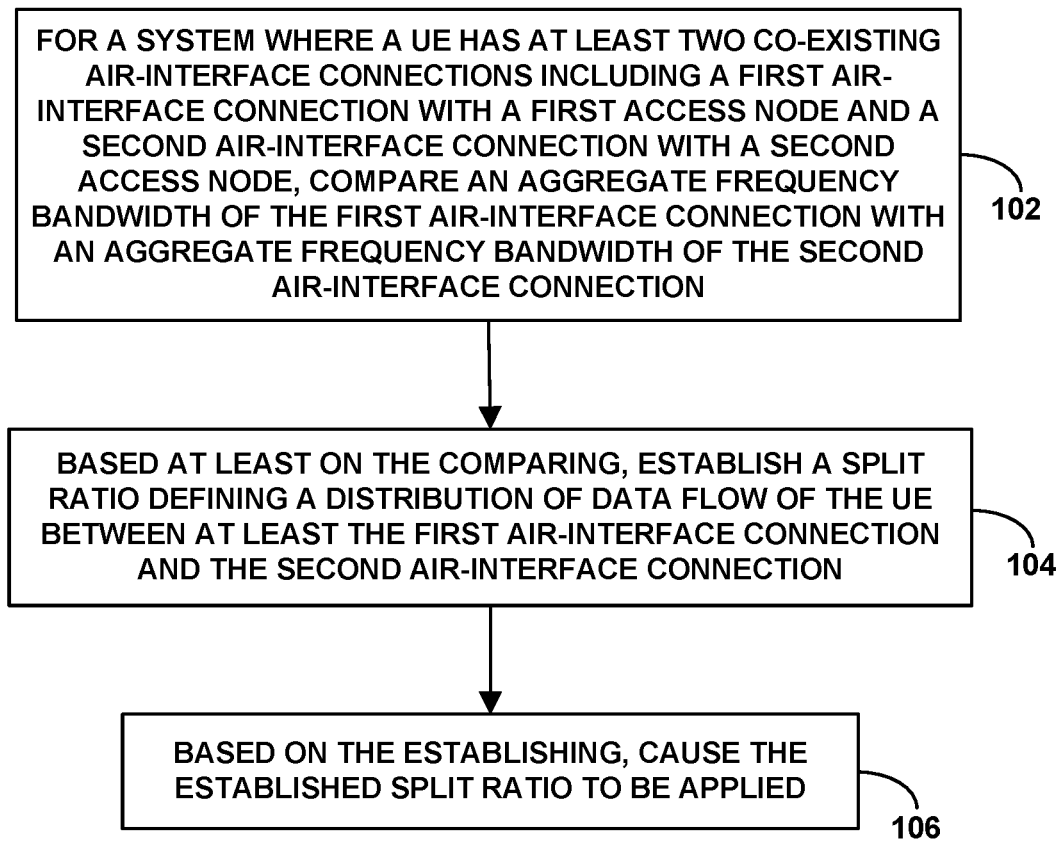
FIG. 12 is another flow chart depicting operations that can be carried out in accordance with the disclosure.

FIG. 12 is a flow chart depicting an example method that could be carried out in accordance with the present disclosure to control data split of a UE when the UE has at least two co-existing air-interface connections including a first air-interface connection with a first access node and a second air-interface connection with a second access node. As discussed above, this method could be carried out by a computing system, such as by at least one of the two access nodes for instance.

As shown in FIG. 12, at block 102, the example method includes comparing an aggregate frequency bandwidth of the first air-interface connection with an aggregate frequency bandwidth aggregate frequency bandwidth of the second air-interface connection. At block 104, the method then includes, based at least on the comparing, establishing a split ratio defining a distribution of data flow of the UE between at least the first air-interface connection and the second air-interface connection. And at block 106, the method includes, based on the establishing, causing the established split ratio to be applied.

In line with the discussion above, the split ratio at issue in this method could be an uplink split ratio and/or a downlink split ratio. Further, if the split ratio is an uplink split ratio, the act of causing the established split ratio to be applied could involve transmitting to the UE a directive that causes the UE to apply the established split ratio. And if the split ratio is a downlink split ratio, in a scenario where an entity splits the downlink data flow of the UE between the first and second connections, the act of causing the established split ratio to be applied could involve causing the entity to apply the established downlink split ratio.

As further discussed above, the method could additionally include determining the aggregate frequency bandwidth of the first air-interface connection and determining the aggregate frequency bandwidth of the second air-interface connection. And the act of comparing the aggregate frequency bandwidth of the first air-interface connection with the aggregate frequency bandwidth of the second air-interface connection could involve comparing the determined aggregate frequency bandwidth of the first air-interface connection with the determined aggregate frequency bandwidth of the second air-interface connection.

Further, the act of establishing the split ratio based on the comparing of the determined aggregate frequency bandwidth of the first air-interface connection with the determined aggregate frequency bandwidth of the second air-interface connection could involve establishing the split ratio based on a ratio of (i) the determined aggregate frequency bandwidth of the first air-interface connection to (ii) the determined aggregate frequency bandwidth of the second air-interface connection. For instance, this could involve setting the split ratio to be equal to the ratio of (i) the determined aggregate frequency bandwidth of the first air-interface connection to (ii) the determined aggregate frequency bandwidth of the second air-interface connection.

Still further, the act of establishing the split ratio based on the comparing of the determined aggregate frequency bandwidth of the first air-interface connection with the determined aggregate frequency bandwidth of the second air-interface connection could involve (i) selecting one of the first and second air-interface connections based on the determined aggregate frequency bandwidth of the selected air-interface connection being greater than the determined aggregate frequency bandwidth of the other of the first and second air-interface connections and (ii) based on the selecting, establishing as the split ratio a split ratio that will put a majority of the data flow of the UE on the identified air-interface connection.

Figure 13:
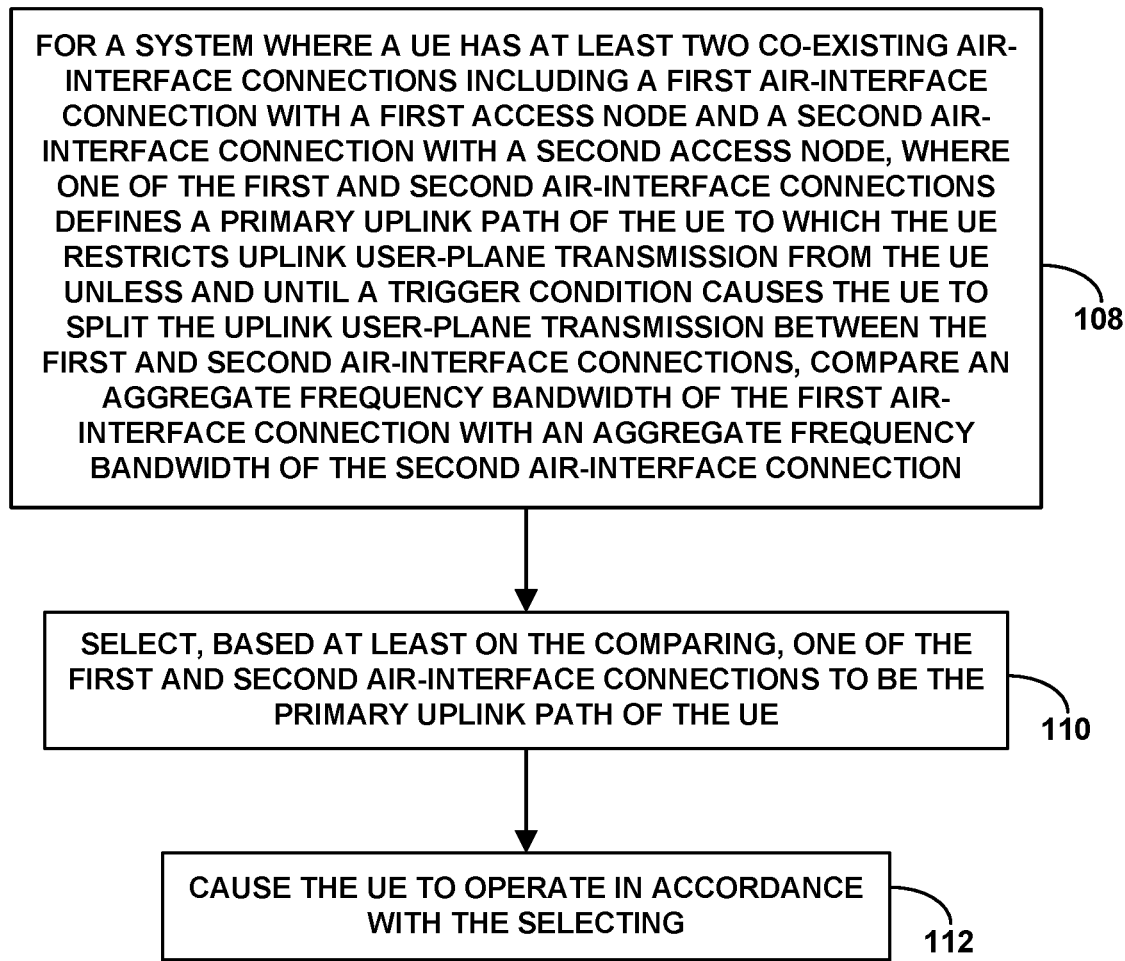
FIG. 13 is another flow chart depicting operations that can be carried out in accordance with the disclosure.

FIG. 13 is next a flow chart depicting an example method that could be carried out in accordance with the present disclosure to control uplink communication from a UE when the UE has at least two co-existing air-interface connections including a first air-interface connection with a first access node and a second air-interface connection with a second access node, where one of the first and second air-interface connections defines a primary uplink path of the UE to which the UE restricts uplink user-plane transmission from the UE unless and until a trigger condition causes the UE to split the uplink user-plane transmission between the first and second air-interface connections.

As shown in FIG. 13, at block 108, the method includes comparing an aggregate frequency bandwidth of the first air-interface connection with an aggregate frequency bandwidth of the second air-interface connection. At block 110, the method then includes selecting, based at least on the comparing, one of the first and second air-interface connections to be the primary uplink path of the UE. And at block 112, the method includes causing the UE to operate in accordance with the selecting.

In line with the discussion above, this method could be carried out by a given one of the access nodes. And the act of causing the UE to operate in accordance with the selecting could involve transmitting from the given access node to the UE a directive that causes the UE to use the selected air-interface connection as the primary uplink path of the UE.

Further, as discussed above, the act of selecting, based at least on the comparing, one of the first and second air-interface connections to be the primary uplink path of the UE could involve (i) determining, based on the comparing, that the aggregate frequency bandwidth of the first air-interface connection is greater than the aggregate frequency bandwidth of the second access node and (ii) based at least on the determining, selecting the first air-interface connection to be the primary uplink path of the UE.

In addition, as discussed above, the method as so defined could also involve determining the aggregate frequency bandwidth of the first air-interface connection and determining the aggregate frequency bandwidth of the second air-interface connection. And in that case, the act of comparing the aggregate frequency bandwidth of the first air-interface connection with the aggregate frequency bandwidth of the second air-interface connection could likewise involve comparing the determined aggregate frequency bandwidth of the first air-interface connection with the determined aggregate frequency bandwidth of the second air-interface connection.

Various other features discussed herein can be implemented in this context as well, and vice versa.

Example System Structure

Figure 14:
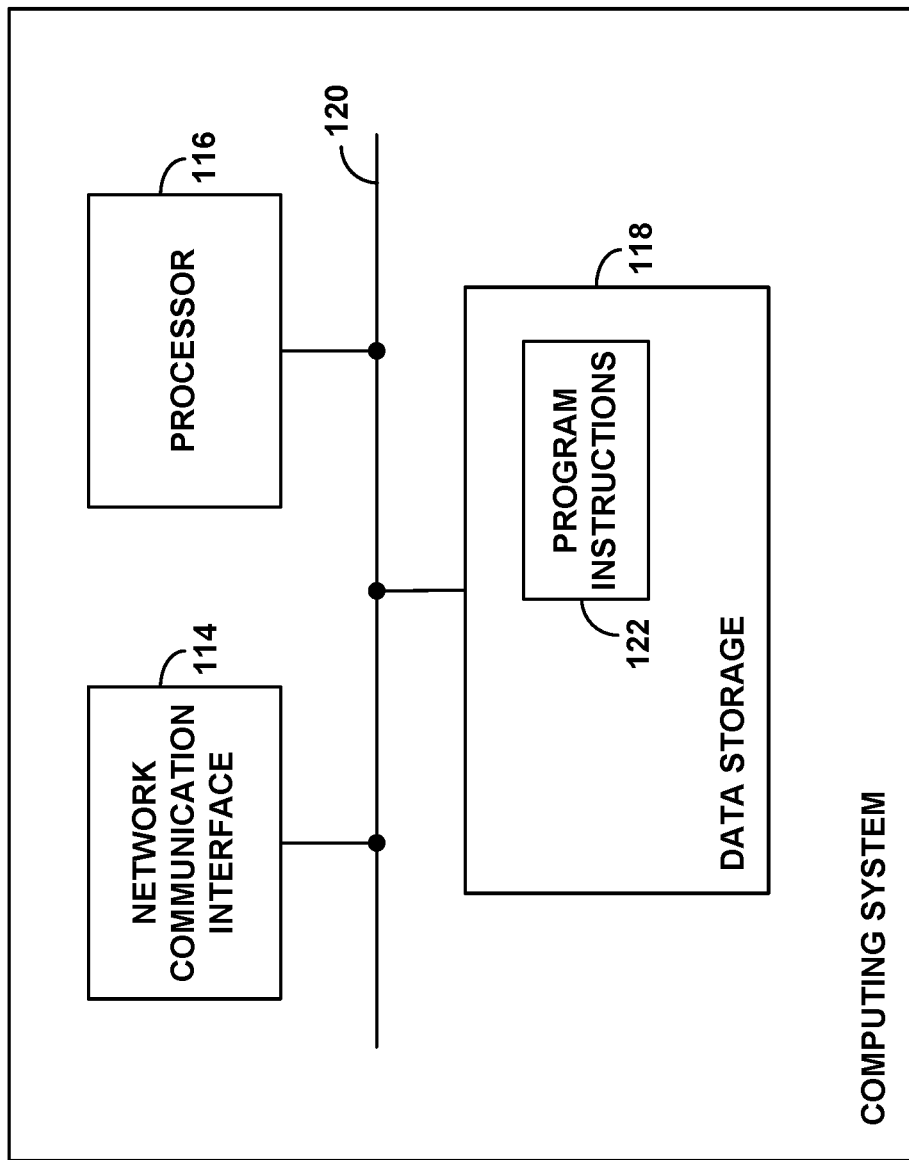
FIG. 14 is a simplified block diagram of an example computing system operable in accordance with the disclosure.

FIG. 14 is a simplified block diagram of an example computing system that could be operable in accordance with the present disclosure. As noted above, such a computing system could be provided at one of the access nodes in the arrangement of FIG. 1, among other possibilities.

As shown in FIG. 14, the example computing system includes a network communication interface 114, a processor 116, and non-transitory data storage 118, which could be integrated together and/or interconnected by a system bus, network, or other connection mechanism 120.

The network communication interface 114 could comprise a physical network connector (e.g., an Ethernet interface) and associated communication logic (e.g., protocol stacks) to facilitate wired or wireless network communication with various other entities. The processor 116 could comprise one or more general purpose processors (e.g., microprocessors) and/or one or more specialized processors (e.g., application specific integrated circuits). And the non-transitory data storage 118 could comprise one or more volatile and/or non-volatile storage components (e.g., magnetic, optical, or flash storage, necessarily non-transitory).

As shown, the data storage 118 could then store program instructions 122, which could be executable by the processor 116 to cause the computing system to carry out various operations described herein, including but not limited to the operations discussed above in relation to one or more of FIGS. 2-13.

Various other features discussed herein can be implemented in this context as well, and vice versa.

Figure 15:
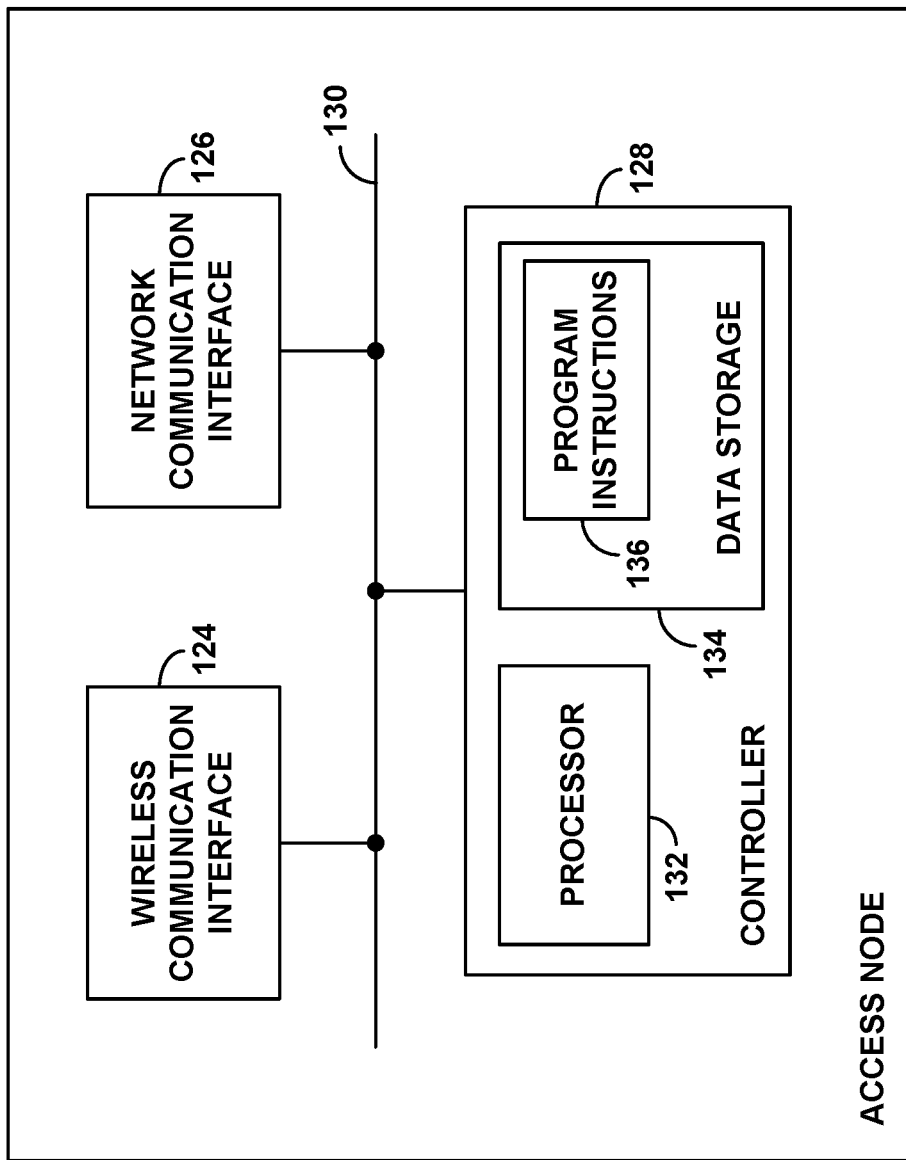
FIG. 15 is a simplified block diagram of an example access node operable in accordance with the disclosure.

FIG. 15 is a simplified block diagram of an example access node that could be operable in accordance with the present disclosure. This access node could represent the one of the access nodes described, such as the 4G eNB 12 or the 5G gNB 14, among other possibilities.

As shown in FIG. 15, the example access node includes a wireless communication interface 124, a network communication interface 126, and a controller 128, which could be integrated together and/or communicatively linked together by a system bus, network, or other connection mechanism 130.

In an example implementation, the wireless communication interface 126 could comprise an antenna structure, which could be tower mounted or could take other forms, and associated components such as a power amplifier and a wireless transceiver, so as to facilitate providing a cell defining an air interface and engaging air-interface communication on the air interface in accordance with an applicable RAT. And the network communication interface 126 could comprise a physical network connector (e.g., an Ethernet interface) and associated communication logic (e.g., protocol stacks) to facilitate wired or wireless network communication with various other entities, such as with other access nodes and various core-network entities.

Further, the controller 128 (which might be provided by a baseband unit of the access node, for instance) could comprise a processor 132 (e.g., one or more general purpose processors (e.g., microprocessors) and/or one or more specialized processors (e.g., application specific integrated circuits)), non-transitory data storage 134 (e.g., one or more volatile and/or non-volatile storage components (such as magnetic, optical, or flash storage), necessarily non-transitory), and program instructions 136 stored in the non-transitory data storage and executable by processor to carry out various operations such as those discussed herein, including for example the operations discussed above in relation to one or more of FIGS. 2-13.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling uplink communication from a user equipment device (UE) when the UE has at least two co-existing air-interface connections including a first air-interface connection with a first access node and a second air-interface connection with a second access node, wherein one of the first and second air-interface connections defines a primary uplink path of the UE to which the UE restricts uplink user-plane transmission from the UE unless and until a trigger condition causes the UE to split the uplink user-plane transmission between the first and second air-interface connections, the method comprising:
   comparing a maximum number of multiple-input-multiple-output (MIMO) layers of the first air-interface connection with a maximum number of MIMO layers of the second air-interface connection;
   selecting, based at least on the comparing, one of the first and second air-interface connections to be the primary uplink path of the UE; and
   causing the UE to operate in accordance with the selecting.

2. The method of claim 1, wherein the method is carried out by a given one of the first and second access nodes, and wherein causing the UE to operate in accordance with the selecting comprises transmitting from the given access node to the UE a directive that causes the UE to use the selected air-interface connection as the primary uplink path of the UE.

3. The method of claim 2, wherein transmitting the directive to the UE comprises transmitting to the UE a Radio Resource Control (RRC) connection reconfiguration message defining the directive.

4. The method of claim 1, wherein selecting, based at least on the comparing, one of the first and second air-interface connections to be the primary uplink path of the UE comprises:
   determining, based on the comparing, that the maximum number of MIMO layers of the first air-interface connection is greater than the maximum number of MIMO layers of the second air-interface connection; and
   based at least on the determining, selecting the first air-interface connection to be the primary uplink path of the UE.

5. The method of claim 1, further comprising:
   determining the maximum number of MIMO layers of the first air-interface connection based on a maximum number of MIMO layers on which the UE can be served on the first air-interface connection; and
   determining the maximum number of MIMO layers of the second air-interface connection based on a maximum number of MIMO layers on which the UE can be served on the second air-interface connection,
   wherein comparing the maximum number of MIMO layers of the first air-interface connection with the maximum number of MIMO layers of the second air-interface connection comprises comparing the determined maximum number of MIMO layers of the first air-interface connection with the determined maximum number of MIMO layers of the second air-interface connection.

6. The method of claim 1, wherein the first air-interface connection operates in accordance with a first radio access technology (RAT) and the second air-interface connection operates in accordance with a second RAT different than the first RAT.

7. The method of claim 1, further comprising:
   after selecting one of the first and second air-interface connections to be the primary uplink path of the UE and causing the UE to operate in accordance with the selecting, later causing the other of the first and second air-interface connections to be the primary uplink path of the UE.

8. A computing system configured to control uplink communication from a user equipment device (UE) when the UE has at least two co-existing air-interface connections including a first air-interface connection with a first access node and a second air-interface connection with a second access node, wherein one of the first and second air-interface connections defines a primary uplink path of the UE to which the UE restricts uplink user-plane transmission from the UE unless and until a trigger condition causes the UE to split the uplink user-plane transmission between the first and second air-interface connections, the computing system comprising:
   a processor;
   non-transitory data storage; and
   program instructions stored in the non-transitory data storage and executable by the processor to cause the computing system to carry out operations including:
      comparing a maximum number of multiple-input-multiple-output (MIMO) layers of the first air-interface connection with a maximum number of MIMO layers of the second air-interface connection,
      selecting, based at least on the comparing, one of the first and second air-interface connections to be the primary uplink path of the UE, and
      causing the UE to operate in accordance with the selecting.

9. The computing system of claim 8, wherein the system is implemented at a given one of the first and second access nodes, and wherein causing the UE to operate in accordance with the selecting comprises transmitting from the given access node to the UE a directive that causes the UE to use the selected air-interface connection as the primary uplink path of the UE.

10. The computing system of claim 9, wherein transmitting the directive to the UE comprises transmitting to the UE a Radio Resource Control (RRC) connection reconfiguration message defining the directive.

11. The computing system of claim 8, wherein selecting, based at least on the comparing, one of the first and second air-interface connections to be the primary uplink path of the UE comprises:
   determining, based on the comparing, that the maximum number of MIMO layers of the first air-interface connection is greater than the maximum number of MIMO layers of the second air-interface connection; and based at least on the determining, selecting the first air-interface connection to be the primary uplink path of the UE.

12. The computing system of claim 8, wherein the operations further include:
   determining the maximum number of MIMO layers of the first air-interface connection based on a maximum number of MIMO layers on which the UE can be served on the first air-interface connection; and
   determining the maximum number of MIMO layers of the second air-interface connection based on a maximum number of MIMO layers on which the UE can be served on the second air-interface connection,
   wherein comparing the maximum number of MIMO layers of the first air-interface connection with the maximum number of MIMO layers of the second air-interface connection comprises comparing the determined maximum number of MIMO layers of the first air-interface connection with the determined maximum number of MIMO layers of the second air-interface connection.

13. The computing system of claim 8, wherein the first air-interface connection operates in accordance with a first radio access technology (RAT) and the second air-interface connection operates in accordance with a second RAT different than the first RAT.

14. The computing system of claim 8, wherein the operations further include:
   after selecting one of the first and second air-interface connections to be the primary uplink path of the UE and causing the UE to operate in accordance with the selecting, later causing the other of the first and second air-interface connections to be the primary uplink path of the UE.

15. At least one non-transitory computer-readable medium having stored thereon program instructions executable by at least one processing unit to carry out operations for controlling uplink communication from a user equipment device (UE) when the UE has at least two co-existing air-interface connections including a first air-interface connection with a first access node and a second air-interface connection with a second access node, wherein one of the first and second air-interface connections defines a primary uplink path of the UE to which the UE restricts uplink user-plane transmission from the UE unless and until a trigger condition causes the UE to split the uplink user-plane transmission between the first and second air-interface connections, the operations comprising:
   comparing a maximum number of multiple-input-multiple-output (MIMO) layers of the first air-interface connection with a maximum number of MIMO layers of the second air-interface connection;
   selecting, based at least on the comparing, one of the first and second air-interface connections to be the primary uplink path of the UE; and
   causing the UE to operate in accordance with the selecting.

16. The at least one non-transitory computer-readable medium of claim 15, wherein causing the UE to operate in accordance with the selecting comprises transmitting to the UE a directive that causes the UE to use the selected air-interface connection as the primary uplink path of the UE, wherein transmitting the directive to the UE comprises transmitting to the UE a Radio Resource Control (RRC) connection reconfiguration message defining the directive.

17. The at least one non-transitory computer-readable medium of claim 15, wherein selecting, based at least on the comparing, one of the first and second air-interface connections to be the primary uplink path of the UE comprises:
   determining, based on the comparing, that the maximum number of MIMO layers of the first air-interface connection is greater than the maximum number of MIMO layers of the second air-interface connection; and
   based at least on the determining, selecting the first air-interface connection to be the primary uplink path of the UE.

18. The at least one non-transitory computer-readable medium of claim 15, wherein the operations further comprise:
   determining the maximum number of MIMO layers of the first air-interface connection based on a maximum number of MIMO layers on which the UE can be served on the first air-interface connection; and
   determining the maximum number of MIMO layers of the second air-interface connection based on a maximum number of MIMO layers on which the UE can be served on the second air-interface connection,
   wherein comparing the maximum number of MIMO layers of the first air-interface connection with the maximum number of MIMO layers of the second air-interface connection comprises comparing the determined maximum number of MIMO layers of the first air-interface connection with the determined maximum number of MIMO layers of the second air-interface connection.

19. The at least one non-transitory computer-readable medium of claim 15, wherein the first air-interface connection operates in accordance with a first radio access technology (RAT) and the second air-interface connection operates in accordance with a second RAT different than the first RAT.

20. The at least one non-transitory computer-readable medium of claim 15, wherein the operations further comprise:
   after selecting one of the first and second air-interface connections to be the primary uplink path of the UE and causing the UE to operate in accordance with the selecting, later causing the other of the first and second air-interface connections to be the primary uplink path of the UE.

* * * * *